(12) United States Patent
Adamson et al.

(10) Patent No.: US 7,960,059 B2
(45) Date of Patent: Jun. 14, 2011

(54) PRODUCT AND METHOD FOR THE PROCESSING OF PRECURSORS FOR LITHIUM PHOSPHATE ACTIVE MATERIALS

(75) Inventors: George Adamson, Henderson, NV (US); Jeremy Barker, Oxfordshire (GB); Allan Dirilo, Henderson, NV (US); Titus Faulkner, Henderson, NV (US); M. Yazid Saidi, Henderson, NV (US); Jeffrey Swoyer, Port Washington, WI (US)

(73) Assignee: Valence Technology, Inc., Las Vegas, NV (US)

( * ) Notice: Subject to any disclaimer, the term of this patent is extended or adjusted under 35 U.S.C. 154(b) by 662 days.

(21) Appl. No.: 12/046,942

(22) Filed: Mar. 12, 2008

(65) Prior Publication Data

US 2008/0157024 A1 Jul. 3, 2008

Related U.S. Application Data

(62) Division of application No. 10/961,673, filed on Oct. 8, 2004, now Pat. No. 7,348,100.

(60) Provisional application No. 60/513,242, filed on Oct. 21, 2003.

(51) Int. Cl.
*H01M 4/58* (2010.01)
*C01B 25/45* (2006.01)

(52) U.S. Cl. ............ 429/231.1; 429/231.95; 429/231.3; 429/223; 429/218.1; 252/518.1; 423/303

(58) Field of Classification Search .............. 423/179.5, 423/323, 593.1, 594.1, 595.5; 429/218.1, 429/209, 220–224, 229, 231.1–231.6, 231.9, 429/231.95, 322; 252/182.1, 500, 518.1, 252/519.1, 519.15, 521.2
See application file for complete search history.

(56) References Cited

U.S. PATENT DOCUMENTS

| | | | |
|---|---|---|---|
| 3,660,546 A | 5/1972 | Lovold | |
| 4,216,045 A * | 8/1980 | Morioka | 156/242 |
| 4,985,317 A | 1/1991 | Adachi et al. | |
| 5,478,671 A * | 12/1995 | Idota | 429/221 |
| 5,804,335 A * | 9/1998 | Kamauchi et al. | 429/231.95 |
| 5,910,382 A | 6/1999 | Goodenough et al. | |
| 6,136,472 A | 10/2000 | Barker et al. | |
| 6,196,482 B1 | 3/2001 | Goto | |
| 6,387,568 B1 | 5/2002 | Barker et al. | |
| 6,528,033 B1 * | 3/2003 | Barker et al. | 423/306 |
| 6,794,084 B2 * | 9/2004 | Adamson et al. | 429/218.1 |
| 2004/0013943 A1 | 1/2004 | Stoker et al. | |
| 2004/0018135 A1 | 1/2004 | Adamson et al. | |

OTHER PUBLICATIONS

International Search Report PCT/US04/34229 dated Mar. 15, 2006.

* cited by examiner

*Primary Examiner* — Stanley Silverman
*Assistant Examiner* — Kallambella Vijayakumar
(74) *Attorney, Agent, or Firm* — Cynthia S. Kovacevic; Brian T. Mangum; Roger A. Williams

(57) ABSTRACT

Methods for producing an electrode active material precursor, comprising;
a) producing a mixture comprising particles of lithium hydrogen phosphate, having a first average particle size, and a metal hydroxide, having a second average particle size; and
b) grinding said mixture in a jet mill for a period of time suitable to produce a generally homogeneous mixture of particles having a third average size smaller than said first average size. The precursor may be used as a starting material for making electrode active materials for use in a battery, comprising lithium, a transition metal, and phosphate or a similar anion.

21 Claims, 3 Drawing Sheets

PRODUCT AND METHOD FOR THE PROCESSING OF PRECURSORS FOR LITHIUM PHOSPHATE ACTIVE MATERIALS

This application is a divisional of and claims priority to U.S. Ser. No. 10/961,673, filed Oct. 8, 2004, now U.S. Pat. No. 7,348,100 issued on Mar. 25, 2008 which claims priority under 35 U.S.C. §119(e) to U.S. provisional application Ser. No. 60/513,242 filed Oct. 21, 2003.

FIELD OF THE INVENTION

The present invention relates to methods of making precursors for electrode materials, and more particularly electroactive materials for lithium batteries.

BACKGROUND OF THE INVENTION

A wide variety of electrochemical cells, or "batteries," are known in the art. In general, batteries are devices that convert chemical energy into electrical energy, by means of an electrochemical oxidation-reduction reaction. Batteries are used in a wide variety of applications, particularly as a power source for devices that cannot practicably be powered by centralized power generation sources (e.g., by commercial power plants using utility transmission lines).

Batteries can generally be described as comprising three components: an anode that contains a material that is oxidized (yields electrons) during discharge of the battery (i.e., while it is providing power); a cathode that contains a material that is reduced (accepts electrons) during discharge of the battery; and an electrolyte that provides for transfer of ions between the cathode and anode. During discharge, the anode is the negative pole of the battery, and the cathode is the positive pole. Batteries can be more specifically characterized by the specific materials that make up each of these three components. Selection of these components can yield batteries having specific voltage and discharge characteristics that can be optimized for particular applications.

Batteries containing lithium and sodium afford many potential benefits, because these metals are light in weight, while possessing high standard potentials. For a variety of reasons, lithium batteries are, in particular commercially attractive because of their high energy density, higher cell voltages, and long shelf-life.

Lithium batteries typically comprise from one or more lithium electrochemical cells containing electrochemically active (electroactive) materials. Among such batteries are those having metallic lithium anodes and metal chalcogenide (oxide) cathodes, typically referred to as "lithium metal" batteries. The electrolyte typically comprises a salt of lithium dissolved in one or more solvents, typically nonaqueous aprotic organic solvents. Other electrolytes are solid electrolytes (typically polymeric matrixes) that contain an ionic conductive medium (typically a lithium containing salt dissolved in organic solvents) in combination with a polymer that itself may be ionically conductive but electrically insulating.

A lithium battery that uses an "insertion anode" rather than lithium metal is typically referred to as a "lithium ion" battery. Insertion or "intercalation" electrodes contain materials having a lattice structure into which an ion can be inserted and subsequently extracted. Rather than chemically altering the intercalation material, the ions slightly expand the internal lattice lengths of the compound without extensive bond breakage or atomic reorganization. Insertion anodes contain, for example, lithium metal chakcogenide, lithium metal oxide, or carbon materials such as coke and graphite. These negative electrodes are used with lithium-containing insertion cathodes. In their initial condition, the cells are not charged, since the anode does not contain a source of cations. Thus, before use, such cells must be charged in order to transfer cations (lithium) to the anode from the cathode. During discharge the lithium is then transferred from the anode back to the cathode. During subsequent recharge, the lithium is again transferred back to the anode where it reinserts. This back-and-forth transport of lithium ions (Li+) between the anode and cathode during charge and discharge cycles has led to these cells being called "rocking chair" batteries.

A variety of materials have been suggested for use as cathode active materials in lithium batteries. Such materials include, for example, $MoS_2$, $MnO_2$, $TiS_2$, $NbSe_3$, $LiCoO_2$, $LiNiO_2$, $LiMn_2O_4$, $V_6O_{13}$, $V_2O_5$, $SO_2$ $CuCl_2$. Transition metal oxides such as those of the general formula $Li_xM_yO_z$, are among those materials preferred in such batteries having intercalation electrodes. Other materials include lithium transition metal phosphates, such as $LiFePO_4$, and $Li_3V_2(PO_4)_3$. Such materials having structures similar to olivine or NASICON materials are among those known in the art.

Transition metal phosphate active materials are typically synthesized in a solid state reaction. Starting materials in particle form are mixed to produce an intimate mixture of particles. When heat is applied to effect reaction, the solid particles react with one another through a variety of surface reactions accompanied by diffusion of reactive materials into and out of the various particles in the mixture.

In general, such a cathode material must exhibit a high free energy of reaction with lithium, be able to intercalate a large quantity of lithium, maintain its lattice structure upon insertion and extraction of lithium, allow rapid diffusion of lithium, afford good electrical conductivity, not be significantly soluble in the electrolyte system of the battery, and be readily and economically produced. However, many of the cathode materials known in the art lack one or more of these characteristics. Moreover, the method by which such materials are made may also have an effect on one or more of these characteristics.

SUMMARY OF THE INVENTION

The present invention provides methods for producing an evenly and finely ground electrode active material precursor. Such methods comprise:
  a) producing a mixture comprising particles of lithium hydrogen phosphate of the general formula of $Li_xH_{3-x}PO_4$, having a first average particle size, and a metal hydroxide, having a second average particle size; and
  b) grinding said mixture in a jet mill for a period of time suitable to produce a generally homogeneous mixture of particles having a third average size smaller than said first average size.

In another embodiment an electroactive material precursor is made comprising a lithium hydrogen phosphate particle having an average particle size substantially smaller than an initial average particle size. The electroactive material precursor is formed by first producing a mixture comprising a lithium hydrogen phosphate with a first average particle size having the general formula of $Li_xH_{3-x}PO_4$, with a metal hydroxide having a second average particle size. Next, the mixture is ground in a jet mill to produce a substantially homogeneous mixture of particles having a third average size smaller than said first average size.

The present invention also provides a method for producing an electrode active material of the formula

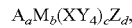

wherein
(i) A is selected from the group consisting of Li, Na, K, and mixtures thereof, and $0 < a \leq 9$;
(ii) M is one or more metals, comprising at least one metal which is capable of undergoing oxidation to a higher valence state, and $1 \leq b \leq 3$;
(iii) $XY_4$ is selected from the group consisting of $X'O_{4-x}Y'_x$, $X'O_{4-y}Y'_{2y}$, mixtures thereof, and mixtures thereof with $X''S_4$, where $X'$ is P or a mixture of P with an element selected from the group consisting of As, Sb, Si, Ge, V, S, and mixtures thereof; $X''$ is P or a mixture of P with an element selected from the group consisting of As, Sb, Si, Ge, V and mixtures thereof; $Y'$ is selected from the group consisting of halogen, S, N, and mixtures thereof; $0 \leq x \leq 3$; and $0 < y \leq 2$; and $0 < c \leq 3$;
(iv) Z is OH, halogen, or mixtures thereof, and $0 \leq d \leq 6$; and
(v) M, $XY_4$, Z, a, b, c, d, x and y are selected so as to maintain electroneutrality of said compound.

In such methods, a mixture is made comprising a first mixture of a lithium hydrogen phosphate having the general formula of $Li_xH_{3-x}PO_4$, with a first average particle size, and a metal hydroxide having a second average particle size. Preferably, said first average particle size is between about 70 times and 110 times greater than said second average particle size. The first mixture is then ground in a jet mill. A second mixture is then produced by admixing the first mixture and a second group of compounds comprising a metal oxide, and a carbon source. Finally the second mixture is heated to react the second mixture to make the electroactive material.

It has been found that methods of the present invention allow an efficient and complete reaction of materials for making electrode active materials. Embodiments of this invention afford benefits including, one or more of, improved processability, reduced cost, ease of handling, and improved performance of materials made using such precursors. Specific benefits and embodiments of the present invention are apparent from the detailed description set forth herein. It should be understood, however, that the detailed description and specific examples, while indicating embodiments among those preferred, are intended for purposes of illustration only and are not intended to limited the scope of the invention.

Figure 1:
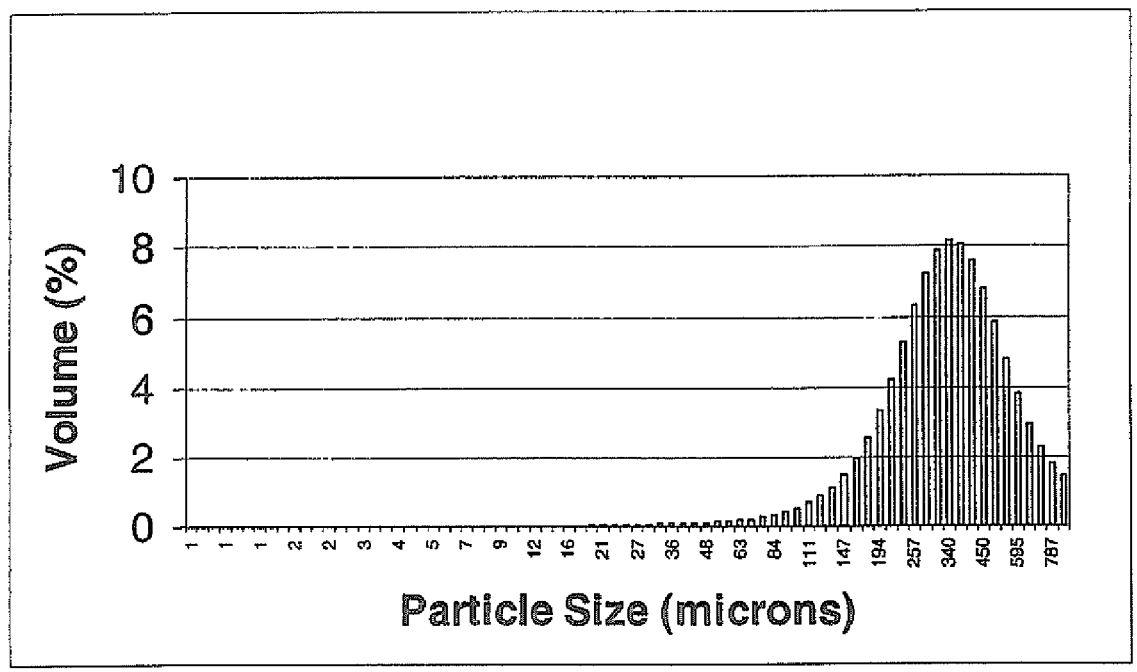
FIG. 1 is a graphical representation of the size distribution of unground lithium dihydrogen phosphate particles.
Figure 2:
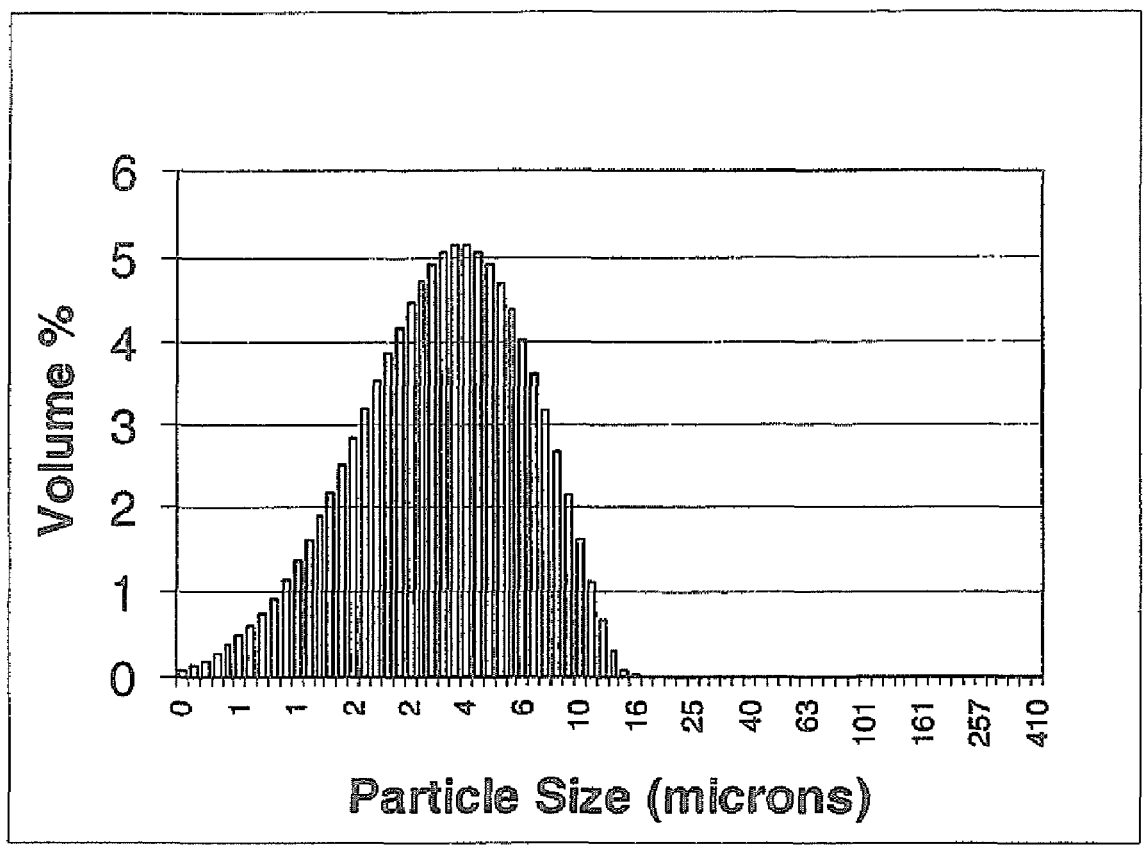
FIG. 2 is a graphical representation of the size distribution of unground magnesium hydroxide particles.
Figure 3:
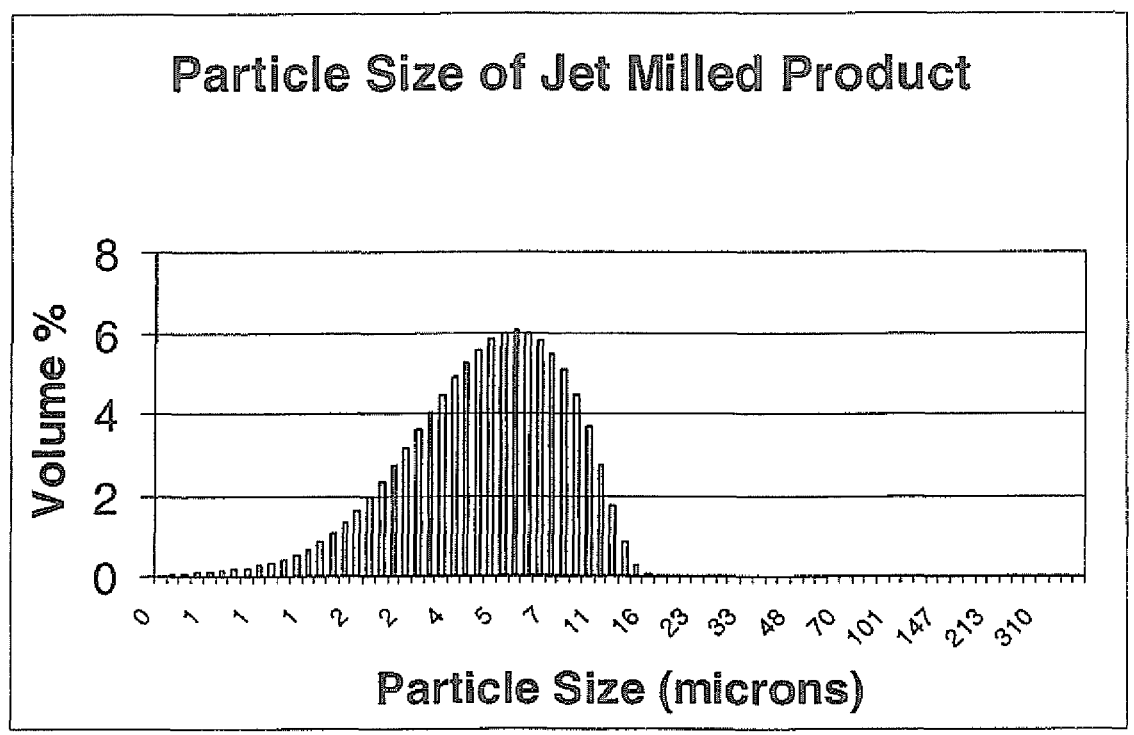
FIG. 3 is a graphical representation of the size distribution of a jet milled mixture of magnesium hydroxide and lithium dihydrogen phosphate.

It should be noted that the plots set forth in FIGS. 1, 2 and 3 are intended to show the general characteristics of materials among those useful in the methods of this invention, for the purpose of the description of such embodiments herein. These plots may not precisely reflect the characteristics of any given embodiment, and are not necessarily intended to define or limit specific embodiments within the scope of this invention.

DETAILED DESCRIPTION OF THE PREFERRED EMBODIMENTS

The present invention provides precursors, and electrode active materials made using such precursors, for use in a battery. In particular, the methods of the present invention provide precursors for making alkaline metal batteries. Such precursors are of the general formula $A_xH_{3-x}PO_4$, where A is selected from the group consisting of Li, Na, K, and mixtures thereof, and x is from about 1 to about 3. Preferably A comprises Li. A preferred precursor is $Li_xH_{3-x}PO_4$, herein referred to as "lithium hydrogen phosphate." Preferred embodiments include those where x is about 1, where x is about 2, and where x is about 3. Preferably, x is about 1.

Lithium hydrogen phosphate can be procured from many sources. One commercial source is lithium dihydrogen phosphate sold by Sigma-Aldrich Co. Lithium hydrogen phosphate may also be made by the reaction of lithium carbonate ($Li_2CO_3$) and phosphoric acid (i.e. orthophosphoric acid, $H_3PO_4$), in the following reaction mechanism (1).

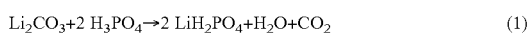

$$Li_2CO_3 + 2\,H_3PO_4 \rightarrow 2\,LiH_2PO_4 + H_2O + CO_2 \qquad (1)$$

The lithium hydrogen phosphate is mixed with a metal hydroxide. Such metal hydroxides preferably include hydroxides of metals in Group 2 of the Periodic Table, including Be (Beryllium), Mg (Magnesium), Ca (Calcium), Sr (Strontium), and Ba (Barium). Preferred Group 2 metals include Mg and Ca. $Mg(OH)_2$ is a preferred metal hydroxide.

The lithium hydrogen phosphate can be ground in any jet mill, which are commonly known in the art such as those discussed in Robert H. Perry and Don W. Green, Perry's Chemical Engineer's Handbook, 7th Ed. McGraw Hill, NY, pp. 20-47 to 20-48, 1997. Without being bound by theory, the particles, in a preferred embodiment, become entrained in a fluid and collide with each other and are intimately dispersed and ground through colliding interactions with each constituent in the mixture. In such a preferred embodiment, the mill produces a particularly fine particulate product where the particles that are being entrained in the fluid-flow flow smoothly, and do not have a strong interaction with each other so as to "stick" together. The particles in the jet mill are preferably able to freely interact with one another without becoming intermeshed with one another in the final milled product. Most of the milling process in a jet mill comes about by the interaction of the material being milled. If the material being milled is not free to interact with the other particles in the mill then the milling process is not as effective.

In one embodiment, the starting material is placed into the hopper, and then fed into the milling area, of the jet-mill. One such feed mechanism includes a screw type feeder that continually places a relatively constant amount of material into the jet mill. Once the material is fed into the milling area it becomes entrained in a fluid stream. One example is a pressurized stream of clean dry air. Such a stream of hot dry air at about 80 psi is preferred in the present invention. The product is collected on a filter which is later cleared by pulsing air on the side opposite of the filter from the collection side.

The lithium hydrogen phosphate can be first mixed with the metal hydroxide particles before they are entrained in the fluid-flow of the jet mill. Such a preferred process comprises the further steps:
a) forming a pre-mix comprising said particles of lithium hydrogen phosphate and said particles of metal hydroxide; and
(b) introducing said pre-mix into to said jet mill.

Preferably, the pre-mix is initially dispersed in a v-shaped blender. A commercial source of this equipment is made by Patterson Kelly. This initial blending or mixing allows a substantial intermixing of the metal hydroxide particles into the lithium hydrogen phosphate particles.

The mixture of metal hydroxide and lithium hydrogen phosphate preferably comprises a dispersive effective amount of the metal hydroxide. As used herein, a "dispersive effective amount" is an amount of metal hydroxide sufficient to ensure that the lithium hydrogen phosphate mills properly in the jet mill, under normal operating conditions, to produce a finely ground material. The amount of metal hydroxide in the mixture is preferably from about 1% to about 30%, more preferably from about 1% to about 10%. (Unless specified otherwise herein, all percentages are by weight.) Preferably the mixture comprises at least about 70% of lithium hydrogen phosphate.

Particle size may be determined through any appropriate means. One such method is to use a laser diffraction analyzer. One such analyzer is the Coulter LS100 laser analyzer. A sample is introduced into the analyzer and low angle light scattering is used to determine particle size and concentration. In this way both the size, generally diameter, and fraction of the sample having a particular size can be quickly determined.

The initial particle size of the lithium hydrogen phosphate is generally from about 100 microns to about 900 microns. The initial particle size of the metal hydroxide is generally from about 0.2 microns to about 15 microns. The metal hydroxide has an average particle size that is generally from about 20 times to about 100 times smaller than that of the lithium hydrogen phosphate. When the metal hydroxide particles are added to the lithium hydrogen phosphate particles before being milled in the jet mill, the final milled mixture has a particle size that is preferably from about 0.2 microns to about 15 microns. The average particle size, which has a great majority of lithium hydrogen phosphate particles, has a particle size that is preferably equivalent to the initial particle size of the metal hydroxide. Preferably the milled particle size of the final lithium hydrogen phosphate is essentially equivalent to the particle sizes of the other precursor materials used in making the electroactive material.

The metal hydroxide preferably comprises a metal that is to be included in the electroactive material made using the lithium hydrogen phosphate. In processes using such a preferred metal hydroxide, there is no need to purify the product to remove the metal hydroxide. However, in alternative embodiments, the final lithium hydrogen phosphate material may be purified to remove the metal hydroxide.

Electrode Active Materials:

The electrode active materials made by the processes of this invention may be used in the anode, the cathode, or both, of a battery. As used herein, "battery" refers to a device comprising one or more electrochemical cells for the production of electricity. Each electrochemical cell comprises an anode, a cathode, and an electrolyte. Two or more electrochemical cells may be combined, or "stacked," so as to create a multi-cell battery having a voltage that is the sum of the voltages of the individual cells.

Preferably, the active materials of this invention are used in the cathode. (As used herein, the terms "cathode" and "anode" refer to the electrodes at which oxidation and reduction occur, respectively, during battery discharge. During charging of the battery, the sites of oxidation and reduction are reversed. Also, as used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.)

After milling the lithium hydrogen phosphate sufficiently it is reacted with other components to form the electrode active material. Such electrode active materials comprise lithium or other alkali metals, a transition metal, a phosphate or similar moiety, and (optionally) a halogen or hydroxyl moiety. Such electrode active materials include those of the formula AaMb(XY4)cZd. (As used herein, the word "include," and its variants, is intended to be non-limiting, such that recitation of items in a list is not to the exclusion of other like items that may also be useful in the materials, compositions, devices, and methods of this invention.)

A is selected from the group consisting of Li (lithium), Na (sodium), K (potassium), and mixtures thereof. In a preferred embodiment, A is Li, a mixture of Li with Na, a mixture of Li with K, or a mixture of Li, Na and K. In another preferred embodiment, A is Na, or a mixture of Na with K. Preferably "a" is from about 0.1 to about 6, more preferably from about 0.2 to about 6. Where c=1, "a" is preferably from about 0.1 to about 3, preferably from about 0.2 to about 2. In a preferred embodiment, where c=1, "a" is less than about 1. In another preferred embodiment, where c=1, "a" is about 2. Preferably "a" is from about 0.8 to about 1.2. Where c=2, "a" is preferably from about 0.1 to about 6, preferably from about 1 to about 6. Where c=3, "a" is preferably from about 0.1 to about 6, preferably from about 2 to about 6, preferably from about 3 to about 6. In another embodiment, "a" is preferably from about 0.2 to about 1.0.

In a preferred embodiment, removal of alkali metal from the electrode active material is accompanied by a change in oxidation state of at least one of the metals comprising M. The amount of said metal that is available for oxidation in the electrode active material determines the amount of alkali metal that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

Referring to the general formula $A_a M_b (XY_4)_c Z_d$, the amount (a') of alkali metal that can be removed, as a function of the quantity of (b') and valence state ($V^M$) of oxidizable metal (M), is $$a' = b'(\Delta V^M),$$

where $\Delta V^M$ is the difference between the valence state of the metal in the active material and a valence state readily available for the metal. (The term oxidation state and valence state are used in the art interchangeably.) For example, for an active material comprising iron (Fe) in the +2 oxidation state, $\Delta V^M = 1$ wherein iron may be oxidized to the +3 oxidation state (although iron may also be oxidized to a +4 oxidation state in some circumstances). If b=1 (one atomic unit of Fe per atomic unit of material), the maximum amount (a') of alkali metal (oxidation state +1) that can be removed during cycling of the battery is 1 (one atomic units of alkali metal). If b=1.25, the maximum amount of (a') of alkali metal that can be removed during cycling of the battery is 1.25.

In general, the value of "a" in the active materials can vary over a wide range. In a preferred embodiment, active materials are synthesized for use in preparing a lithium ion battery in a discharged state. Such active materials are characterized by a relatively high value of "a", with a correspondingly low oxidation state of M of the active material. As the battery is charged from its initial uncharged state, an amount a' of lithium is removed from the active material as described above. The resulting structure, containing less lithium (i.e., a−a') than in the as-prepared state as well as the transition metal in a higher oxidation state than in the as-prepared state, is characterized by lower values of a, while essentially maintaining the original value of b. The active materials of this invention include such materials in their nascent state (i.e., as manufactured prior to inclusion in an electrode) and materials formed during operation of the battery (i.e., by insertion or removal of Li or other alkaline metal).

The value of "b" and the total valence of M in the active material must be such that the resulting active material is electrically neutral (i.e., the positive charges of all cationic species in the material balance the negative charges of all anionic species), as further discussed below. The net valence of M ($V^M$) having a mixture of elements (M1, M2 . . . Mt) may be represented by the formula $$V^M = V^{M1}b_1 + V^{M2}b_2 + \ldots V^{Mt}b_t,$$

where $b_1+b_2+ \ldots b_t=1$, and $V^{M1}$ is the oxidation state of M1, $V^{M2}$ is the oxidation state of M2, etc. (The net valence of M and other components of the electrode active material is discussed further, below.)

M is one or more metals including at least one metal that is capable of undergoing oxidation to a higher valence state (e.g., $Co^{+2} \rightarrow Co^{+3}$), preferably a transition metal selected from Groups 4-11 of the Periodic Table. As referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein. In another preferred embodiment, M further comprises a non-transition metal selected from Groups 2, 3, and 12-16 of the Periodic Table.

In another preferred embodiment, preferably where c=1, M comprises $Co_e,Fe_fM^1_g M^2_h M^3_i$, wherein $M^1$ is at least one transition metal from Groups 4 to 11, $M^2$ is at least one +2 oxidation state non-transition metal, $M^3$ is at least one +3 oxidation state non transition metal, $e \geq 0$, $f \geq 0$, $g \geq 0$, $h \geq 0$, $i \geq 0$ and (e+f+g+h+i) =b. Preferably, at least one of e and f are greater than zero, more preferably both. In a preferred embodiment $0<(e+f+g+h+i) \leq 2$, more preferably $0.8 \leq (e+f+g) \leq 1.2$, and even more preferably $0.9 \leq (e+f+g) \leq 1.0$. Preferably, $e \geq 0.5$, more preferably $e \geq 0.8$. Preferably, $0.01 \leq f \leq 0.5$, more preferably $0.05 \leq f \leq 0.15$. Preferably, $0.01 \leq g \leq 0.5$, more preferably $0.05 \leq g \leq 0.2$. In a preferred embodiment, (h+i)>1, preferably $0.01 \leq (h+i) \leq 0.5$, and even more preferably $0.01 \leq (h+i) \leq 0.1$. Preferably, $0.01 \leq h \leq 0.2$, more preferably $0.01 \leq h \leq 0.1$. Preferably $0.01 \leq i \leq 0.2$, more preferably $0.01 \leq i \leq 0.1$.

Transition metals useful herein include those selected from the group consisting of Ti (Titanium), V (Vanadium), Cr (Chromium), Mn (Manganese), Fe (Iron), Co (Cobalt), Ni (Nickel), Cu (Copper), Zr (Zirconium), Nb (Niobium), Mo (Molybdenum), Ru (Ruthenium), Rh (Rhodium), Pd (Palladium), Ag (Silver), Cd (Cadmiumn), Hf (Hafnium), Ta (Tantalum), W (Tungsten), Re (Rhenium), Os (Osmium), Ir (Iridium), Pt (Platinum), Au (Gold), Hg (Mercury), and mixtures thereof. Preferred are the first row transition series (the 4th Period of the Periodic Table), selected from the group consisting of Ti, V, Cr, Mn, Fe, Co, Ni, Cu, and mixtures thereof. Particularly preferred transition metals include those selected from the group consisting of Fe, Co, Ti, Mn, and mixtures thereof In a preferred embodiment, M is $Co_{1-m}Fe_m$, where $0<m \leq 0.5$. Preferably $0.01<m \leq 0.2$. Although, a variety of oxidation states for such transition metals are available, in some embodiments it is most preferable that the transition metals have a +2 oxidation state. As used herein, the recitation of a genus of elements, materials or other components, from which an individual component or mixture of components can be selected, is intended to include all possible sub-generic combinations of the listed components, and mixtures thereof.

In a preferred embodiment, M further comprises one or more non-transition metals. As referred to herein, "non-transition metals" include metals and metalloids from Groups 2, 3, and 12-16 of the Periodic Table that are capable of forming stable active materials and do not significantly impede the insertion or removal of lithium or other alkaline metals into the active materials under normal operating conditions. Preferably, such elements do not include C (carbon), Si (silicon), N (nitrogen) and P (phosphorus). Preferred non-transition metals include those not readily capable of undergoing oxidation to a higher valence state in the electrode active material under normal operating conditions. Among the non-transition metals useful herein are those selected from the group consisting of Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd Neodymium), Sm (Samarium); Group 12 elements, particularly Zn (zinc) and Cd (cadmium); Group 13 elements, particularly B (Boron), Al (Aluminum), Ga (Gallium), In (Indium), Tl (Thallium); Group 14 elements, particularly Si (Silicon), Ge (Gennanium), Sn (Tin), and Pb (Lead); Group 15 elements, particularly As (Arsenic), Sb (Antimony), and Bi (Bismuth); Group 16 elements, particularly Te (Tellurium); and mixtures thereof. Preferred non-transition metals include the Group 2 elements, Group 12 elements, Group 13 elements, and Group 14 elements. In a particularly preferred embodiment, the non-transition metal comprises a +2 oxidations state non-transition metal, the source of which is from the metal hydroxide used in the methods of this invention. Particularly preferred non-transition metals include those selected from the group consisting of Mg, Ca, Zn, Sr, Pb, Cd, Sn, Ba, Be, Al, and mixtures thereof. Particularly preferred are non-transition metals selected from the group consisting of Mg, Ca, Zn, Ba, Al, and mixtures thereof.

As further discussed herein, "b" is selected so as to maintain electroneutrality of the electrode active material. In a preferred embodiment, where c=1, "b" is from about 1 to about 2, preferably about 1. In another preferred embodiment, where c=2, "b" is from about 2 to about 3, preferably about 2.

$XY_4$ is an anion selected from the group consisting of $X'O_{4-x}Y'_x$, $X'O_{4-y}Y'_{2y}$, mixtures thereof, and mixtures thereof with $X''S_4$, where $X'$ is P (phosphorus) or a mixture of P with an element selected from the group consisting of As (arsenic), Sb (antimony), Si (silicon), Ge (germanium), V (vanadium) S (sulfur), and mixtures thereof, $X''$ is P or a mixture of P with an element selected from the group consisting of As, Sb, Si, Ge, V, and mixtures thereof. $XY_4$ anions useful herein include phosphate, silicate, germanate, vanadate, arsenate, antimonate, sulfur analogs thereof, and mixtures thereof. In a preferred embodiment, $X'$ and $X''$ are each P or a mixture with P and Si. In a particularly preferred embodiment, $X'$ and $X''$ are P.

$Y'$ is selected from the group consisting of halogen, S, N, and mixtures thereof. Preferably $Y'$ is F (fluorine). In a preferred embodiment $0 \leq x \leq 3$; and $0<y \leq 2$, such that a portion of the oxygen (O) in the $XY_4$ moiety is substituted with halogen. In another preferred embodiment, x and y are 0. In a particularly preferred embodiment $XY_4$ is $X'O_4$, where $X'$ is preferably P or Si, more preferably P. In another particularly preferred embodiment, $XY_4$ is $PO_{4-x}Y'_x$, where $Y'$ is halogen and $0 \leq x \leq 1$. Preferably $0.01 \leq x \leq 0.05$, more preferably $0.02 \leq x \leq 0.03$.

In preferred embodiments of this invention, $XY_4$ is $PO_4$ (phosphate), a mixture of $PO_4$ with another $X'Y'_4$ group (i.e., where $X'$ is not P, $Y'$ is not O, or both, as defined above). When part of the phosphate group is substituted, it is preferred that the substitute group be present in a minor amount relative to the phosphate. In a preferred embodiment, $XY_4$ comprises 80% or more phosphate and up to about 20% of one or more phosphate substitutes. Phosphate substitutes include, without limitation, silicate, sulfate, antimonate, germanate, arsenate, monofluoromonophosphate, difluoromonophosphate, sulfur analogs thereof, and combinations thereof. Preferably, $XY_4$ comprises a maximum of about 10% of a phosphate substitute or substitutes. (The percentages are based on mole percent.) Preferred $XY_4$ groups include those of the formula $(PO_4)_{1-k}(B)_k$, where B represents an $XY_4$ group or combination of $XY_4$ groups other than phosphate, and $k \leq 0.5$. Preferably, $k \leq 0.8$, more preferably $k \leq 0.2$, more preferably $k \leq 0.1$.

Z is OH, halogen, or mixtures thereof. In a preferred embodiment, Z is selected from the group consisting of OH (hydroxyl), F (fluorine), Cl (chlorine), Br (bromine) and mixtures thereof. In a preferred embodiment, Z is OH. In another preferred embodiment, Z is F, or mixtures of F with OH, Cl, or Br. In one preferred embodiment, d=0. In another preferred embodiment, d>0, preferably from about 0.1 to about 6, more preferably from about 0.2 to about 6. In such embodiments, where c=1, d is preferably from about 0.1 to about 3, preferably from about 0.2 to about 2. In a preferred embodiment, where c=1, d is about a. Where c=2, d is preferably from about 0.1 to about 6, preferably from about 1 to about 6. Where c=3, d is preferably from about 0.1 to about 6, preferably from about 2 to about 6, preferably from about 3 to about 6.

The composition of M, $XY_4$, Z and the values of a, b, c, d, x, and y are selected so as to maintain electroneutrality of the electrode active material. As referred to herein "electroneutrality" is the state of the electrode active material wherein the sum of the positively charged species (e.g., A and M) in the material is equal to the sum of the negatively charged species (e.g., $XY_4$) in the material. Preferably, the $XY_4$ moieties are comprised to be, as a unit moiety, an anion having a charge of −2, −3, or −4, depending on the selection of X', X", Y', and x and y. When $XY_4$ is a mixture of groups such as the preferred phosphate/phosphate substitutes discussed above, the net charge on the $XY_4$ anion may take on non-integer values, depending on the charge and composition of the individual groups $XY_4$ in the mixture.

In general, the valence state of each component element of the electrode active material may be determined in reference to the composition and valence state of the other component elements of the material. By reference to the general formula $A_aM_b(XY_4)_cZ_d$, the electroneutrality of the material may be determined using the formula $$(V^A)a + (V^M)b + (V^X)c = (V^Y)4c + (V^Z)d$$

where $V^A$ is the net valence of A, $V^M$ is the net valence of M, $V^Y$ is the net valence of Y, and $V^Z$ is the net valence of Z. As referred to herein, the "net valence" of a component is (a) the valence state for a component having a single element which occurs in the active material in a single valence state; or (b) the mole-weighted sum of the valence states of all elements in a component comprising more than one element, or comprising a single element having more than one valence state. The net valence of each component is represented in the following formulae.

$$(V^A)b = [(V^{A1})a + (Va1^{A2})a^2 + \ldots (V^{An})a^n]/n;\ a^1 + a^2 + \ldots a^n = a$$

$$(V^M)b = [(V^{M1})b^1 + (V^{M2})b^2 + \ldots (V^{Mn})b^n]/n;\ b^1 + b^2 + \ldots b^n = b$$

$$(V^X)c = [(V^{X1})c^1 + (V^{X2})c^2 + \ldots (V^{Xn})c^n]/n;\ c^1 + c^2 + \ldots c^n = c$$

$$(V^Y)c = [(V^{Y1})c^1 + (V^{Y2})c^2 + \ldots (V^{Yn})c^n]/n;\ c^1 + c^2 + \ldots c^n = c$$

$$(V^Z)d = [(V^{Z1})d^1 + (V^{Z2})d^2 + \ldots (V^{Zn})d^n]/n;\ d^1 + d^2 + \ldots d^n = d$$

In general, the quantity and composition of M is selected given the valency of X, the value of "c," and the amount of A, so long as M comprises at least one metal that is capable of oxidation. The calculation for the valence of M can be simplified, where $V^A = 1$, $V^Z = 1$, as follows.

For compounds where c=1: $(V^M)b = (V^Y)4 + d - a - (V^X)$

For compounds where c=3: $(V^M)b = (V^Y)12 + d - a - (V^X)3$

The values of a, b, c, d, x, and y may result in stoichiometric or non-stoichiometric formulas for the electrode active materials. In a preferred embodiment, the values of a, b, c, d, x, and y are all integer values, resulting in a stoichiometric formula. In another preferred embodiment, one or more of a, b, c, d, x and y may have non-integer values. It is understood, however, in embodiments having a lattice structure comprising multiple units of a non-stoichiometric formula $A_aM_b(XY_4)_cZ_d$, that the formula may be stoichiometric when looking at a multiple of the unit. That is, for a unit formula where one or more of a, b, c, d, x, or y is a non-integer, the values of each variable become an integer value with respect to a number of units that is the least common multiplier of each of a, b, C, d, x and y. For example, the active material $Li_2Fe_{0.5}Mg_{0.5}PO_4F$ is non-stoichiometric. However, in a material comprising two of such units in a lattice structure, the formula is $Li_4FeMg(PO_4)_2F_2$.

A preferred electrode active material embodiment comprises a compound of the formula $$Li_aM_b(PO_4)Z_d,$$

wherein
(a) $0.1 < a \leq 4$;
(b) M is $M'_{1-m}M''_m$, where M' is at least one transition metal from Groups 4 to 11 of the Periodic Table; M" is at least one non-transition metal from Groups 2, 3, and 12-16 of the Periodic Table, $0 < m < 1$, and $1 \leq b \leq 3$; and
(c) Z comprises halogen, and $0 \leq d \leq 4$; and wherein M, Z, a, b, and d are selected so as to maintain electroneutrality of said compound. Preferably, M' is selected from the group consisting of Fe, Co, Ni, Mn, Cu, V, Zr, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Pb, Cd, Sn, Ba, Be, Al, and mixtures thereof, more preferably M" is selected from the group consisting of Mg, Ca, Zn, Ba, Al, and mixtures thereof Preferably Z comprises F.

Another preferred embodiment comprises a compound of the formula:

$$A_aM_b(XY_4)_3Z_d,$$

wherein
(a) A is selected from the group consisting of Li, Na, K, and mixtures thereof, and $2 \leq a \leq 9$;
(b) M comprises one or more metals, comprising at least one metal which is capable of undergoing oxidation to a higher valence state, and $1 \leq b \leq 3$;
(c) $XY_4$ is selected from the group consisting of $X'O_{4-x}Y'_x$, $X'O_{4-y}Y'_{2y}$, mixtures thereof, and mixtures thereof with $X"S_4$, where X' is P or a mixture of P with an element selected from the group consisting of As, Sb, Si, Ge, V, S, and mixtures thereof; X" is P or a mixture of P with an element selected from the group consisting of As, Sb, Si, Ge, V, and mixtures thereof; Y' is selected from the group consisting of halogen, S, N, and mixtures thereof; $0 \leq x < 3$; and $0 < y < 4$;

(d) Z is OH, halogen, or mixtures thereof, and $0 \leq d \leq 6$; and (e) M, $XY_4$, Z, a, b, d, x and y are selected so as to maintain electroneutrality of said compound. In a preferred embodiment, A comprises Li, or mixtures of Li with Na or K.

In another preferred embodiment, A comprises Na, K, or mixtures thereof. In a preferred embodiment, M comprises two or more transition metals from Groups 4 to 11 of the Periodic Table, preferably transition metals selected from the group consisting of Fe, Co, Ni, Mn, Cu, V, Zr, Ti, Cr, and mixtures thereof. In another preferred embodiment, M comprises $M'_{1-m}M''_m$, where M' is at least one transition metal from Groups 4 to 11 of the Periodic Table; and M'' is at least one element from Groups 2, 3, and 12-16 of the Periodic Table; and $0 < m < 1$. Preferably, M' is selected from the group consisting of Fe, Co, Ni, Mn, Cu, V, Zr, Ti, Cr, and mixtures thereof, more preferably M' is selected from the group consisting of Fe, Co, Mn, Cu, V, Cr, and mixtures thereof. Preferably, M'' is selected from the group consisting of Mg, Ca, Zn, Sr, Pb, Cd, Sn, Ba, Be, Al, and mixtures thereof; more preferably, M'' is selected from the group consisting of Mg, Ca, Zn, Ba, Al, and mixtures thereof. In a preferred embodiment, $XY_4$ is $PO_4$. In another preferred embodiment, X' comprises As, Sb, Si, Ge, S, and mixtures thereof, X'' comprises As, Sb, Si, Ge and mixtures thereof; and $0 < x < 3$. In a preferred embodiment, Z comprises F, or mixtures of F with Cl, Br, OH, or mixtures thereof In another preferred embodiment, Z comprises OH, or mixtures thereof with Cl or Br.

Another preferred embodiment comprises a compound of the formula

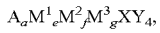

wherein (a) A is selected from the group consisting of Li, Na, K, and mixtures thereof, and $0 < a \leq 2$;

(b) $M^1$ comprises one or more transition metals, where $e > 0$;

(c) $M^2$ comprises one or more +2 oxidation state non transition metals, where $f > 0$;

(d) $M^3$ comprises one or more +3 oxidation state non-transition metal, where $g > 0$;

(e) $XY_4$ is selected from the group consisting of $X'O_{4-x}Y'_x$, $X'O_{4-y}Y'_{2y}$, mixtures thereof, and mixtures thereof with $X''S_4$, where X' is P or a mixture with P and an element selected from the group consisting of As, Sb, Si, Ge, V, S, and mixtures thereof; X'' is P or a mixture of P and an element selected from the group consisting of As, Sb, Si, Ge, V, and mixtures thereof, Y' is selected from the group consisting of halogen, S, N, and mixtures thereof, $0 \leq x \leq 3$; and $0 < y \leq 2$; and (f) $e+f+g \leq 2$, and $M^1$, $M^2$, $M^3$, $XY_4$, a, e, f, g, x, and y are selected so as to maintain electroneutrality of said compound. In embodiments where $XY_4$ is $PO_{4-x}Y'_x$ and $M^1$ is a +2 oxidation state transition metal, $a+2e+2f+3g=3-x$.

Preferably, $e+f+g=b$. In a preferred embodiment $0 < (e+f+g) < 2$, more preferably $0.8 \leq (e+f+g) \leq 1.5$, and even more preferably $0.9 \leq (e+f+g) \leq 1$, wherein $0.01 \leq (f+g) \leq 0.5$, more preferably $0.05 \leq (f+g) \leq 0.2$, and even more preferably $0.05 \leq (f+g) \leq 0.1$.

In a preferred embodiment, A is Li. Preferably, $M^1$ is at least one transition metal from Groups 4 to 11 of the Periodic Table; $M^2$ is at least one non-transition metal from Groups 2, 3, and 12-16 of the Periodic Table, and $M^3$ is a +3 oxidation state metal selected from Group 13. Preferably $M^1$ is selected from the group consisting of Fe, Co, Ni, Mn, Cu, V, Zr, Ti, Cr, and mixtures thereof; more preferably $M^1$ is a +2 oxidation state transition metal selected from the group consisting of Fe, Co, Mn, Cu, V, Cr, and mixtures thereof. Preferably $M^2$ is selected from the group consisting +2 oxidation state non-transition metals and mixtures thereof; more preferably $M^2$ is selected from the group consisting of Be, Mg, Ca, Sr, Ba, Ra, Zn, Cd, Hg and mixtures thereof. Preferably, $M^3$ is a +3 oxidation state non-transition metal, preferably $M^3$ is selected from Group 13, more preferably Sc, Y, La, Ae, B, Al, Ga, In, Tl and mixtures thereof. Preferably $M^3$ is Al. Preferably $0 < (f+g) < 1$, preferably $0.01 \leq (f+g) \leq 0.3$, more preferably $0.05 \leq (f+g) \leq 0.1$. Preferably, $0.01 \leq f \leq 0.3$, more preferably $0.05 \leq f \leq 0.1$, and even more preferably $0.01 \leq f \leq 0.03$. Also preferably, $0.01 \leq g \leq 0.3$, more preferably $0.05 \leq g \leq 0.1$, and even more preferably $0.01 \leq g \leq 0.03$.

Another preferred embodiment comprises a compound of the formula

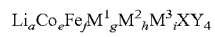

wherein (a) $0 < a \leq 2$, $e > 0$, and $f > 0$;

(b) $M^1$ is one or more transition metals, where $g \geq 0$;

(c) $M^2$ is one or more +2 oxidation state non-transition metals, where $h \geq 0$;

(d) $M^3$ is one or more +3 oxidation state non-transition metals, where $i \geq 0$;

(e) $XY_4$ is selected from the group consisting of $X'O_{4-x}Y'_x$, $X'O_{4-y}Y'_{2y}$, mixtures thereof, and mixtures thereof with $X''S_4$, where X' is P or a mixture of P with an element selected from the group consisting of As, Sb, Si, Ge, V, S, and mixtures thereof; X'' is P or a mixture of P with an element selected from the group consisting of As, Sb, Si, Ge, V, and mixtures thereof; Y' is selected from the group consisting of halogen, S, N, and mixtures thereof; $0 \leq x \leq 3$; and $0 < y \leq 2$; and (f) $(e+f+g+h+i) \leq 2$, and $M^1$, $M^2$, $M^3$, $XY_4$, a, e, f, g, h, i, x, and y are selected so as to maintain electroneutrality of said compound.

Preferably, $0.8 \leq (e+f+g+h+i) \leq 1.2$, more preferably $0.9 \leq (e+f+g+h+i) \leq 1$. Preferably, $e \geq 0.5$, more preferably, $e \geq 0.8$. Preferably, $0.01 \leq f \leq 0.5$, more preferably, $0.05 \leq f \leq 0.15$. Preferably, $0.01 \leq g \leq 0.5$, more preferably, $0.05 \leq g \leq 0.2$. Preferably $M^1$ is selected from the group consisting of Ti, V, Cr, Mn, Ni, Cu and mixtures thereof. Preferably, $M^1$ is selected from the group consisting of Mn, Ti, and mixtures thereof.

Preferably, $(h+i) > 0$, more preferably $0.01 \leq (h+i) \leq 0.5$, more preferably $0.02 \leq (h+i) \leq 0.3$. Preferably, $0.01 \leq h \leq 0.2$, more preferably, $0.01 \leq h \leq 0.1$. Preferably, $M^2$ is selected from the group consisting of Be, Mg, Ca, Sr, Ba, and mixtures thereof More preferably, $M^2$ is Mg. Preferably, $0.01 \leq i \leq 0.2$, more preferably $0.01 \leq i \leq 0.1$. Preferably, $M^3$ is selected from the group consisting of B, Al, Ga, In, and mixtures thereof. More preferably, $M^3$ is Al.

In one embodiment, $XY_4$ is $PO_4$. In another embodiment, $XY_4$ is $PO_{4-x}F_x$, and $0 \leq x \leq 1$, preferably, $0.01 \leq x \leq 0.05$.

Another preferred embodiment comprises a compound having an olivine structure. During charge and discharge of the battery, lithium ions are added to, and removed from, the active material preferably without substantial changes in the crystal structure of the material. Such materials have sites for the alkali metal (e.g., Li), the transition metal (M), and the $XY_4$ (e.g., phosphate) moiety. In some embodiments, all sites of the crystal structure are occupied. In other embodiments, some sites may be unoccupied, depending on, for example, the oxidation states of the metal (M). Among such preferred compounds are those of the formula

$LiM(PO_{4-x}Y'_x)$ wherein M is $M^1_g M^2_h M^3_i M^4_j$, and
(a) $M^1$ is one or more transition metals;
(b) $M^2$ is one or more +2 oxidation state non-transition metals;
(c) $M^3$ is one or more +3 oxidation state non-transition metals,
(d) $M^4$ is one or more +1 oxidation state non-transition metals;
(e) $Y'$ is halogen; and
(f) $g, >0; h \geq 0; i \geq 0; j \geq 0; (g+h+i+j) \leq 1$; and the net valence of M is 2-x. Preferably, $g \geq 0.8$, more preferably, $g \geq 0.9$. Preferably, $M^1$ is a +2 oxidation state transition metal selected from the group consisting of V, Cr, Mn, Fe, Co, Ni, and mixtures thereof. More preferably, $M^1$ is selected from the group consisting of Fe, Co, and mixtures thereof. Preferably $M^1$ additionally comprises Ti.

Preferably, $(h+i)>0.1$, more preferably, $0.02 \leq (h+i) \leq 0.5$, more preferably, $0.02 \leq (h+i) \leq 0.3$. Preferably, $0.01 \leq i \leq 0.2$, more preferably, $0.01 \leq h \leq 0.1$. Preferably, $M^2$ is selected from the group consisting of Be, Mg, Ca, Sr, Ba, and mixtures thereof. Preferably, $0.01 \leq i \leq 0.2$, more preferably, $0.01 \leq i \leq 0.1$. Preferably, $M^3$ is Al.

In one embodiment, $j=0$. In another embodiment, $0.01 \leq j \leq 0.1$. Preferably, $M^4$ is selected from the group consisting of Li, Na, and K. More preferably, $M^4$ is Li.

In one embodiment, $x=0$. In another embodiment, $0<x \leq 1$. In such an embodiment, preferably, $0.01 \leq x \leq 0.05$, and $(g+h+i+j)<1$. In an embodiment where $j=0$, preferably, $(g+h+i)=1-x$.

Non-limiting examples of active materials of the invention include the following: $Li_{0.95}Co_{0.8}Fe_{0.5}Al_{0.05}PO_4$, $Li_{1.025}Co_{0.85}Fe_{0.05}Al_{0.025}Mg_{0.05}PO_4$, $Li_{1.025}Co_{0.80}Fe_{0.10}Al_{0.025}Mg_{0.05}PO_4$, $Li_{1.025}Co_{0.45}Fe_{0.45}Al_{0.025}Mg_{0.05}PO_4$, $Li_{1.025}Co_{0.75}Fe_{0.15}Al_{0.025}Mg_{0.05}PO_4$, $Li_{1.025}Co_{0.7}(Fe_{0.4}Mn_{0.6})_{0.2}Al_{0.025}Mg_{0.05}PO_4$, $Li_{1.025}Co_{0.75}Fe_{0.15}Al_{0.025}Mg_{0.05}PO_4$, $Li_{1.025}Co_{0.85}Fe_{0.05}Al_{0.025}Mg_{0.05}PO_4$, $Li_{1.025}Co_{0.7}Fe_{0.08}Mn_{0.12}Al_{0.025}Mg_{0.05}PO_4$, $LiCo_{0.75}Fe_{0.15}Al_{0.025}Ca_{0.05}PO_{3.975}F_{0.025}$, $LiCo_{0.80}Fe_{0.10}Al_{0.025}Ca_{0.05}PO_{3.975}F_{0.025}$, $Li_{1.25}Co_{0.6}Fe_{0.1}Mn_{0.075}Mg_{0.025}Al_{0.05}PO_4$, $Li_{1.0}Na_{0.25}Co_{0.6}Fe_{0.1}Cu_{0.075}Mg_{0.05}Al_{0.05}PO_4$, $Li_{1.025}Co_{0.8}Fe_{0.1}Al_{0.025}Mg_{0.075}PO_4$, $Li_{1.025}Co_{0.6}Fe_{0.05}Al_{0.12}Mg_{0.0325}PO_{3.75}F_{0.25}$, $Li_{1.025}Co_{0.7}Fe_{0.1}Mg_{0.0025}Al_{0.04}PO_{3.75}F_{0.25}$, $Li_{0.75}Co_{0.5}Fe_{0.05}Mg_{0.015}Al_{0.04}PO_3F$, $Li_{0.75}Co_{0.5}Fe_{0.025}Cu_{0.025}Be_{0.015}Al_{0.04}PO_3F$, $Li_{0.75}Co_{0.5}Fe_{0.025}Mn_{0.025}Ca_{0.015}Al_{0.04}PO_3F$, $Li_{1.025}Co_{0.6}Fe_{0.05}B_{0.12}Ca_{0.0325}PO_{3.75}F_{0.25}$, $Li_{1.025}Co_{0.65}Fe_{0.05}Mg_{0.0125}Al_{0.1}PO_{3.75}F_{0.25}$, $Li_{1.025}Co_{0.65}Fe_{0.05}Mg_{0.065}Al_{0.14}PO_{3.975}F_{0.025}$, $Li_{1.075}Co_{0.8}Fe_{0.05}Mg_{0.025}Al_{0.05}PO_{3.975}F_{0.025}$, $LiCo_{0.8}Fe_{0.1}Al_{0.025}Mg_{0.05}PO_{3.975}F_{0.025}$, $Li_{0.25}Fe_{0.7}Al_{0.45}PO_4$, $LiMnAl_{0.067}(PO_4)_{0.8}(SiO_4)_{0.2}$, $Li_{0.95}Co_{0.9}Al_{0.05}Mg_{0.05}PO_4$, $Li_{0.95}Co_{0.8}Ca_{0.15}Al_{0.05}PO_4$, $Li_{0.5}Na_{0.25}Mn_{0.6}Ca_{0.375}Al_{0.1}PO_4$, $Li_{0.25}Al_{0.25}Mg_{0.25}Co_{0.75}PO_4$, $Na_{0.55}B_{0.15}Ni_{0.75}Ba_{0.25}PO_4$, $Li_{1.025}Co_{0.9}Al_{0.025}Mg_{0.05}PO_4$, $K_{1.025}Ni_{0.09}Al_{0.025}Ca_{0.05}PO_4$, $Li_{0.95}Co_{0.9}Al_{0.05}Mg_{0.05}PO_4$, $Li_{0.95}Fe_{0.8}Ca_{0.15}Al_{0.05}PO_4$, $Li_{1.025}Co_{0.7}(Fe_{0.4}Mn_{0.6})_{0.2}Al_{0.025}Mg_{0.05}PO_4$, $Li_{1.025}Co_{0.8}Fe_{0.1}Al_{0.025}Mg_{0.05}PO_4$, $Li_{1.025}Co_{0.9}Al_{0.025}Mg_{0.05}PO_4$, $Li_{1.025}Co_{0.75}Fe_{0.15}Al_{0.025}Mg_{0.025}PO_4$, $LiCo_{0.75}Fe_{0.15}Al_{0.025}Ca_{0.05}PO_{3.975}F_{0.025}$, $LiCo_{0.9}Al_{0.025}Mg_{0.05}PO_{3.975}F_{0.025}$, $Li_{0.75}Co_{0.625}Al_{0.25}PO_{3.75}F_{0.25}$, $Li_{0.075}Co_{0.8}Cu_{0.05}Mg_{0.025}Al_{0.05}PO_{3.975}F_{0.025}$, $Li_{1.075}Fe_{0.8}Mg_{0.075}Al_{0.05}PO_{3.975}F_{0.025}$, $Li_{1.075}Co_{0.8}Mg_{0.075}Al_{0.05}PO_{3.975}F_{0.025}$, $Li_{1.025}Co_{0.8}Mg_{0.1}Al_{0.05}PO_{3.975}F_{0.025}$, $LiCo_{0.7}Fe_{0.2}Al_{0.025}Mg_{0.05}PO_{3.975}F_{0.025}$, $Li_2Fe_{0.8}Mg_{0.2}PO_4F$; $Li_2Fe_{0.5}Co_{0.5}PO_4F$; $Li_3CoPO_4F_2$; $KFe(PO_3F)F$; $Li_2Co(PO_3F)Br_2$; $Li_2Fe(PO_3F_2)F$; $Li_2FePO_4Cl$; $Li_2MnPO_4OH$; $Li_2CoPO_4F$; $Li_2Fe_{0.5}Co_{0.5}PO_4F$; $Li_2Fe_{0.9}Mg_{0.1}PO_4F$; $Li_2Fe_{0.8}Mg_{0.2}PO_4F$; $Li_{1.25}Fe_{0.9}Mg_{0.1}PO_4F_{0.25}$; $Li_2MnPO_4F$; $Li_2CoPO_4F$; $K_2Fe_{0.9}Mg_{0.1}P_{0.5}As_{0.5}O_4F$; $Li_2MnSbO_4OH$; $Li_4Mn_2(PO_4)_3F$; $Na_4FeMn(PO_4)_3OH$; $Li_4FeV(PO_4)_3Br$; $Li_3VAl(PO_4)_3F$; $K_3VAl(PO_4)_3Cl$; $LiKNaTiFe(PO_4)_3F$; $Li_4Ti_2(PO_4)_3Br$; $Li_3V_2(PO_4)_3F_2$; $Li_6FeMg(PO_4)_3OH$; $Li_2FeMn(P_{0.5}As_{0.5}O_3F)_3$; $Li_4Ti_2(PO_4)_3F$; $Li_{3.25}V_2(PO_4)_3F_{0.25}$; $Li_3Na_{0.75}Fe_2(PO_4)_3F_{0.75}$; $Na_{6.5}Fe_2(PO_4)_3(OH)Cl_{0.5}$; $K_8Ti_2(PO_4)_3F_3Br_2$; $K_8Ti_2(PO_4)_3F_5$; $Li_4Ti_2(PO_4)_3F$; $LiNa_{1.25}V_2(PO_4)_3F_{0.5}Cl_{0.75}$; $K_{3.25}Mn_2(PO_4)_3OH_{0.25}$; $LiNa_{1.25}KTiV(PO_4)_3(OH)_{1.25}Cl$; $Na_8Ti_2(PO_4)_3F_3Cl_2$; $Li_7Fe_2(PO_4)_3F_2$; $Li_8FeMg(PO_4)_3F_{2.25}Cl_{0.75}$; $Li_5Na_{2.5}TiMn(PO_4)_3(OH)_2Cl_{0.5}$; $Na_3K_{4.5}MnCa(PO_4)_3(OH)_{1.5}Br$; $K_9FeBa(PO_4)_3F_2Cl_2$; $Li_7Ti_2(SiO_4)_2(PO_4)F_2$; $Na_8Mn_2(SiO_4)_2(PO_4)F_2Cl$; $Li_3K_2V_2(SiO_4)_2(PO_4)(OH)Cl$; $Li_4Ti_2(SiO_4)_2(PO_4)(OH)$; $Li_2NaKV_2(SiO_4)_2(PO_4)F$; $Li_5TiFe(PO_4)_3F$; $Na_4K_2VMg(PO_4)_3FCl$; $Li_4NaAlNi(PO_4)_3(OH)$; $Li_4K_3FeMg(PO_4)_3F_2$; $Li_2Na_2K_2CrMn(PO_4)_3(OH)Br$; $Li_5TiCa(PO_4)_3F$; $Li_4Ti_{0.75}Fe_{1.5}(PO_4)_3F$; $Li_3NaSnFe(PO_4)_3(OH)$; $Li_3NaGe_{0.5}Ni_2(PO_4)_3(OH)$; $Na_3K_2VCo(PO_4)_3(OH)Cl$; $Li_4Na_2MnCa(PO_4)_3F(OH)$; $Li_3NaKTiFe(PO_4)_3F$; $Li_7FeCo(SiO_4)_2(PO_4)F$; $Li_3Na_3TiV(SiO_4)_2(PO_4)F$; $K_{5.5}CrMn(SiO_4)_2(PO_4)Cl_{0.5}$; $Li_3Na_{2.5}V_2(PO_4)(OH)_{0.5}$; $Na_{5.25}FeMn(SiO_4)_2(PO_4)Br_{0.25}$; $Li_{6.5}VCo(SiO_4)_{2.5}(PO_4)_{0.5}F$; $Na_{7.25}V_2(SiO_4)_{2.25}(PO_4)_{0.75})F_2$; $Li_{1.5}CoPO_4F_{0.5}$; $Li_{1.25}CoPO_4F_{0.25}$; $Li_{1.75}FePO_4F_{0.75}$; $Li_{1.66}MnPO_4F_{0.66}$; $Li_{1.5}Co_{0.75}Ca_{0.25}PO_4F_{0.5}$; $Li_{1.75}Co_{0.8}Mn_{0.2}PO_4F_{0.75}$; $Li_{1.25}Fe_{0.75}Mg_{0.25}PO_4F_{0.25}$; $Li_{1.66}Co_{0.6}Zn_{0.4}PO_4F_{0.66}$; $Li_{1.75}Mn_{0.8}Mg_{0.2}PO_4F_{0.75}$; $Li_3FeZn(PO_4)F_2$; $Li_{0.5}V_{0.75}Mg_{0.5}(PO_4)F_{0.75}$; $Li_3V_{0.5}Al_{0.5}(PO_4)F_{3.5}$; $Li_{0.75}VCa(PO_4)F_{1.75}$; $Li_4CuBa(PO_4)F_4$; $Li_{0.5}V_{0.5}Ca(PO_4)(OH)_{1.5}$; $Li_{1.5}FeMg(PO_4)(OH)Cl$; $LiFeCoCa(PO_4)(OH)_3F$; $Li_3CoBa(PO_4)(OH)_2Br_2$; $Li_{0.75}Mn_{1.5}Al(PO_4)(OH)_{3.75}$; $Li_2Co_{0.75}Mg_{0.25}(PO_4)F$; $LiNaCo_{0.8}Mg_{0.2}(PO_4)F$; $NaKCo_{0.5}Mg_{0.5}(PO_4)F$; $LiNa_{0.5}K_{0.5}Fe_{0.75}Mg_{0.25}(PO_4)F$; $Li_{1.5}K_{0.5}V_{0.5}Zn_{0.5}(PO_4)F_2$; $Li_4Mn_{1.5}Co_{0.5}(PO_3F)_3(OH)_{3.5}$; $K_8FeMg(PO_3F)_3F_3Cl_3Li_5MnCo(PO_4)_2(SiO_4)F$; $Li_4VAl(PO_4)_2(SiO_4)F$; $Li_4MnV(PO_4)_2(SiO_4)F$; $Li_4VFe(PO_4)_2(SiO_4)F$; $Li_{0.6}VPO_4F_{0.6}$; $Li_{0.8}VPO_4F_{0.8}$; $LiVPO_4F$; $Li_3V_2(PO_4)_2F_3$; $LiVPO_4Cl$; $LiVPO_4OH$; $NaVPO_4F$; $Na_3V_2(PO_4)_2F_3$; $LiV_{0.9}Al_{0.1}PO_4F$; $LiFePO_4F$; $LiTiPO_4F$; $LiCrPO_4F$; $LiFePO_4$; $LiFe_{0.9}Mg_{0.1}PO_4$; $LiFe_{0.8}Mg_{0.2}PO_4$; $LiFe_{0.9}Ca_{0.1}PO_4$; $LiFe_{0.8}Ca_{0.2}PO_4$; $LiFe_{0.8}Zn_{0.2}PO_4$; $Li_3V_2(PO_4)_3$; $Li_3Fe_2(PO_4)_3$; $Li_3Mn_2(PO_4)_3$; $Li_3FeTi(PO_4)_3$; $Li_3CoMn(PO_4)_3$; $Li_3FeV(PO_4)_3$; $Li_3VTi(PO_4)_3$; $Li_3FeCr(PO_4)_3$; $Li_3FeMo(PO_4)_3$; $Li_3FeNi(PO_4)_3$; $Li_3FeMn(PO_4)_3$; $Li_3FeAl(PO_4)_3$; $Li_3FeCo(PO_4)_3$; $Li_3Ti_2(PO_4)_3$; $Li_3TiCr(PO_4)_3$; $Li_3TiMn(PO_4)_3$; $Li_3TiMo(PO_4)_3$; $Li_3TiCo(PO_4)_3$; $Li_3TiAl(PO_4)_3$; $Li_3TiNi(PO_4)_3$; $Li_3ZrMnSiP_2O_{12}$; $Li_3V_2SiP_2O_{12}$; $Li_3MnVSiP_2O_{12}$; $Li_3TiVSiP_2O_{12}$; $Li_3TiCrSiP_2O_{12}$; $Li_{3.5}AlVSi_{0.5}P_{2.5}O_{12}$; $Li_{3.5}V2Si_{0.5}P_{2.5}O_{12}$; $Li_{2.5}AlCrSi_{0.5}P_{2.5}O_12$; $Li_{2.5}V_2P_3O_{11.5}F_{0.5}$; $Li_2V_2P_3O_{11}F$; $Li_{2.5}VMnP_3O_{11.5}F_{0.5}$; $Li_2V_{0.5}Fe_{1.5}P_3O_{11}F$; $Li_3V_{0.5}V_{1.5}P_3O_{11.5}F_{0.5}$; $Li_3V_2P_3O_{11}F$; $Li_3Mn_{0.5}V_{1.5}P_3O_{11}F_{0.5}$; $LiCo_{0.8}Feo_{0.1}Ti_{0.025}Mg_{0.05}PO_4$;

$Li_{1.025}Co_{0.8}Fe_{0.1}Ti_{0.025}Al_{0.025}PO_4$; $Li_{1.025}Co_{0.8}Fe_{0.1}Ti_{0.025}$ $Mg_{0.025}PO_{3.975}F_{0.025}$; $LiCo_{0.825}Fe_{0.1}Ti_{0.025}Mg_{0.025}PO_4$; $LiCo_{0.85}Fe_{0.075}Ti_{0.025}Mg_{0.025}PO_4$; $LiCo_{0.8}Fe_{0.1}Ti_{0.025}$ $Al_{0.025}$ $Mg_{0.025}PO_4$, $Li_{1.025}Co_{0.8}Fe_{0.1}Ti_{0.025}Mg_{0.05}PO_4$, $Li_{1.025}Co_{0.8}Fe_{0.1}Ti_{0.025}Al_{0.025}Mg_{0.025}PO_4$, $LiCo_{0.8}Fe_{0.1}$ $Ti_{0.05}Mg_{0.05}PO_4$, and mixtures thereof. Preferred active materials include $LiFePO_4$; $LiFe_{0.9}Mg_{0.1}PO_4$; $LiFe_{0.8}Mg_{0.2}PO_4$; $L_{1.025}Co_{0.85}Feo_{0.5}Al_{0.025}PO_4$, $Li_{1.025}$ $Co_{0.80}Fe_{0.10}Al_{0.025}Mg_{0.05}PO_4$, $Li_{1.025}Co_{0.75}Fe_{0.15}Al_{0.025}$ $Mg_{0.05}PO_4$, $Li_{1.025}Co_{0.7}(Fe_{0.4}Mn_{0.6})_{0.2}Al_{0.025}Mg_{0.05}PO_4$, $LiCo_{0.8}Fe_{0.1}Al_{0.025}Ca_{0.05}PO_{3.975}F_{0.025}$, $LiCo_{0.8}Fe_{0.1}$ $Al_{0.025}Mg_{0.05}PO_{3.975}F_{0.025}$, $LiCo_{0.8}Fe_{0.1}Ti_{0.025}Mg_{0.5}PO_4$; $Li_{1.025}Co_{0.8}Fe_{0.1}Ti_{0.025}Al_{0.025}PO_4$; $Li_{1.025}Co_{0.8}Fe_{0.1}$ $Ti_{0.025}$ $Mg_{0.025}PO_{3.975}F_{0.025}$; $LiCo_{0.825}Feo_{0.1}Ti_{0.025}Mg_{0.025}PO_4$; $LiCo_{0.85}Fe_{0.075}TiO_{0.025}Mg_{0.025}PO_4$; and mixtures thereof. A particularly preferred active material is $LiCo_{0.8}$ $Fe_{0.1}Al_{0.025}Mg_{0.05}PO_{3.975}F_{0.025}$.

Methods of Making Active Materials:

Active materials of general formula $A_aM_b(XY_4)_cZ_d$ are readily synthesized by reacting starting materials in a solid state reaction, with or without simultaneous oxidation or reduction of the metal species involved. Such methods of this invention include methods for producing an electrode active material having the general formula

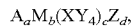
$$A_aM_b(XY_4)_cZ_d,$$

wherein
(i) A is Li or a mixture of Li with an alkali metal selected from the group consisting of Na, K, and mixtures thereof, and $0<a\leq 9$;
(ii) M is one or more metals, comprising at least one metal which is capable of undergoing oxidation to a higher valence state, and $1\leq b\leq 3$;
(iii) $XY_4$ is selected from the group consisting of $X'O_{4-x}$ $Y'_x$, $X'O_{4-y}Y'_{2y}$, mixtures thereof, and mixtures thereof with $X''S_4$, where X' is P or a mixture of P with an element selected from the group consisting of As, Sb, Si, Ge, V, S, and mixtures thereof; X" is P or a mixture of P with an element selected from the group consisting of As, Sb, Si, Ge, V and mixtures thereof; Y' is selected from the group consisting of halogen, S, N, and mixtures thereof; $0\leq x\leq 3$; and $0<y\leq 2$; and $0<c\leq 3$;
(iv) Z is OH, halogen, or mixtures thereof, and $0\leq d\leq 6$; and
(v) M, $XY_4$, Z, a, b, c, d, x and y are selected so as to maintain electroneutrality of said compound;

said method comprising:
a) forming a first mixture comprising (i) a lithium hydrogen phosphate having a first average particle size, and (ii) a first metal hydroxide having a second average particle size, wherein said first average particle size is between about 70 times and 110 times greater than said second average particle size;
b) grinding said first mixture in a jet mill to form a milled lithium hydrogen phosphate;
c) reacting starting materials comprising said milled lithium hydrogen phosphate to produce said active material, wherein said starting materials comprise at least one source of alkali metal A, at least one source of metal M, at least one source of $XY_4$, and, if d>0, at least one source of halide or hydroxide Z.

According to the desired values of a, b, c, and d in the product, starting materials are chosen that contain "a" moles of alkali metal A from lithium hydrogen phosphate and all other sources, "b" moles of metals M from all sources, "c" moles of phosphate (or other $XY_4$ species) from all sources, and "d" moles of halide or hydroxide Z, again taking into account all sources. As discussed below, a particular starting material may be the source of more than one of the components A, M, $XY_4$, or Z. Alternatively, it is possible to run the reaction with an excess of one or more of the starting materials. In such a case, the stoichiometry of the product will be determined by the limiting reagent among the components A, M, $XY_4$, and Z. Because in such a case at least some of the starting materials will be present in the reaction product mixture, it is usually desirable to provide exact molar amounts of all the starting materials.

In one aspect, the moiety $XY_4$ of the active material comprises a substituted group represented by $X'O_{4-x}Y'_x$, where x is less than or equal to 1, and preferably less than or equal to about 0.1. Such groups may be synthesized by providing starting materials containing, in addition to the alkali metal and other metals, lithium hydrogen phosphate and, optionally, other phosphate and other $X'O_4$ materials, in molar amounts equivalent to the amount necessary to produce a reaction product containing $X'O_4$. Where Y' is F, the starting materials farther comprise a source of fluoride in a molar amount sufficient to substitute F in the product as shown in the formula. This is generally accomplished by including at least "x" moles of F in the starting materials. For embodiments where d>0, the fluoride source is used in a molar limiting quantity such that the fluorine is incorporated as a Z-moiety. Sources of F include ionic compounds containing fluoride ion ($F^-$) or hydrogen difluoride ion ($HF_2^-$). The cation may be any cation that forms a stable compound with the fluoride or hydrogen difluoride anion. Examples include+1,+2, and +3 metal cations, as well as ammonium and other nitrogen-containing cations. Ammonium is a preferred cation because it tends to form volatile by-products that are readily removed from the reaction mixture.

Similarly, to make $X'O_{4-x}N_x$, starting materials are provided that contain "x" moles of a source of nitride ion. Sources of nitride are among those known in the art including nitride salts such as $Li_3N$ and $(NH_4)_3N$.

It is preferred to synthesize the active materials of the invention using stoichiometric amounts of the starting materials, based on the desired composition of the reaction product expressed by the subscripts a, b, c, and d above. Alternatively, it is possible to run the reaction with a stoichiometric excess of one or more of the starting materials. In such a case, the stoichiometry of the product will be determined by the limiting reagent among the components. There will also be at least some unreacted starting material in the reaction product mixture. Because such impurities in the active materials are generally undesirable (with the exception of reducing carbon, discussed below), it is generally preferred to provide relatively exact molar amounts of all the starting materials.

The sources of components A, M, phosphate (and, optionally, other $XY_4$ moiety) and optional sources of F or N discussed above, and optional sources of Z may be reacted together in the solid state while heating for a time and at a temperature sufficient to make a reaction product. Lithium hydrogen phosphate is provided according to the method of this invention, and any other starting materials are provided in powder or particulate form. The powders are mixed together with any of a variety of procedures, such as by ball milling, blending in a mortar and pestle, and the like. Thereafter the mixture of powdered starting materials may be compressed into a pellet and/or held together with a binder material to form a closely cohering reaction mixture. The reaction mixture is heated in an oven, generally at a temperature of about 400° C. or greater until a reaction product forms.

Another means for carrying out the reaction at a lower temperature is a hydrothermal method. In a hydrothermal reaction, the starting materials are mixed with a small amount of a liquid such as water, and placed in a pressurized bomb. The reaction temperature is limited to that which can be achieved by heating the liquid water under pressure, and the particular reaction vessel used.

The reaction may be carried out without redox, or if desired, under reducing or oxidizing conditions. When the reaction is carried out under reducing conditions, at least some of the transition metals in the starting materials are reduced in oxidation state. When the reaction is done without redox, the oxidation state of the metal or mixed metals in the reaction product is the same as in the starting materials. Oxidizing conditions may be provided by running the reaction in air. Thus, oxygen from the air is used to oxidize the starting material containing the transition metal.

The reaction may also be carried out with reduction. For example, the reaction may be carried out in a reducing atmosphere such as hydrogen, ammonia, methane, or a mixture of reducing gases. Alternatively, the reduction may be carried out in situ by including in the reaction mixture a reductant that will participate in the reaction to reduce a metal M, but that will produce by-products that will not interfere with the active material when used later in an electrode or an electrochemical cell. The reductant is described in greater detail below.

Sources of alkali metal include lithium hydrogen phosphate and, optionally, any of a number of other salts or ionic compounds of lithium, sodium, potassium, rubidium or cesium. Lithium, sodium, and potassium compounds are preferred, with lithium being particularly preferred. Preferably, the optional alkali metal sources are provided in powder or particulate form. A wide range of such materials is well known in the field of inorganic chemistry. Examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen alrunonium phosphates, dihydrogen ammonium phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of metals M, $M^1$, $M^2$, $M^3$, and $M^4$ include salts or compounds of any of the transition metals, alkaline earth metals, or lanthanide metals, as well as of non-transition elements such as boron, aluminum, gallium, indium, thallium, geranium, tin, lead, antimony, and bismuth. The metal salts or compounds include fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used. The metal M in the starting material may have any oxidation state, depending on the oxidation state required in the desired product and the oxidizing or reducing conditions contemplated, as discussed below. In particular, the cobalt and iron of the active materials may be provided by starting materials with $Co^{+2}$, $Co^{+3}$, $Fe^{+2}$, or $Fe^{+3}$. The metal sources are chosen so that at least one metal in the final reaction product is capable of being in ant oxidation state higher than it is in the reaction product. In a preferred embodiment, the metal sources also include a +2 oxidation state non-transition metal. In a particularly preferred embodiment, the source of the +2 valence state non-transition metal is the metal hydroxide used in the method of this invention. Also preferably, at least one metal source is a source of a+3 oxidation state non-transition metal. In embodiments comprising Ti, a source of Ti is provided in the starting materials and the compounds are made using reducing or non-reducing conditions depending on the other components of the product and the desired oxidation state of Ti and other metals in the final product. Suitable Ti-containing precursors include $TiO_2$, $Ti_2O_3$, and TiO.

Sources of the desired starting material anions, such as phosphates, halides and hydroxides, are provided by lithium hydrogen phosphate and, optionally, any of a number of other salts or compounds containing positively charged cations. Such cations include metal ions such as the alkali metals, alkaline metals, transition metals, or other non-transition elements, as well as complex cations such as ammonium or quaternary ammonium. The phosphate anion in such optional compounds may be phosphate, hydrogen ammonium phosphate, or dihydrogen ammonium phosphate. As with the alkali metal source and metal source discussed above, the phosphate or other $XY_4$ species, halide and hydroxide starting materials are preferably provided in particulate or powder form. Hydrates of any of the above may be used, as can mixtures of the above.

As noted above, the active materials $A_aM_b(XY_4)_cZ_d$ of the invention can contain a mixture of alkali metals A, a mixture of metals M, a phosphate group representative of the $XY_4$ group in the formula and, optionally, a halide or hydroxide Z. In another aspect of the invention, the phosphate group can be completely or partially substituted by a number of other $XY_4$ moieties, which will also be referred to as "phosphate replacements" or "modified phosphates." Thus, active materials are provided according to the invention wherein the $XY_4$ moiety is a phosphate group that is optionally partially replaced by such moieties as sulfate $(SO_4)^{2-}$, monofluoromonophosphate, $(PO_3F)^{2-}$, difluoromonophosphate $(PO_2F)^{2-}$, silicate $(SiO_4)^{4-}$, arsenate, antimonate, and germanate. Analogues of the above oxygenate anions where some or all of the oxygen is replaced by sulfur are also useful in the active materials of the invention, with the exception that the sulfate group may not be completely substituted with sulfur. For example thiomonophosphates may also be used as a partial replacement for phosphate in the active materials of the invention. Such thiomonophosphates include the anions $(PO_3S)^{3-}$, $(PO_2S_2)^{3-}$, $(POS_3)^{3-}$, and $(PS_4)^{3-}$. They are most conveniently available as the sodium, lithium, or potassium derivatives.

To synthesize the active materials containing the modified phosphate moieties, it is usually possible to substitute all or preferably only part of the lithium hydrogen phosphate or other phosphate compounds discussed above with a source of the replacement anion. The replacement is considered on a stoichiometric basis. Starting materials providing the source of the replacement anions are provided along with the other starting materials as discussed above. Synthesis of the active materials containing the modified phosphate groups proceeds as discussed above, either without redox or under oxidizing or reducing conditions. As was the case with the phosphate compounds, the compound containing the modified or replacement phosphate group or groups may also be a source of other components of the active materials. For example, the alkali metal and/or any of the other metals may be a part of the modified phosphate compound.

Non-limiting examples of sources of monofluoromonophosphates include $Na_2PO_3F$, $K_2PO_3F$, $(NH_4)_2PO_3F \cdot H_2O$, $LiNaPO_3F \cdot H_2O$, $LiKPO_3F$, $LiNH_4PO_3F$, $NaNH_4PO_3F$, $NaK_3(PO_3F)_2$ and $CaPO_3F \cdot 2H_2O$. Representative examples of sources of difluoromonophosphate compounds include, without limitation, $NH_4PO_2F_2$, $NaPO_2F_2$, $KPO_2F_2$, $Al(PO_2F_2)_3$, and $Fe(PO_2F_2)_3$.

When it is desired to partially replace phosphorous in the active materials with silicon, it is possible to use a wide variety of silicates and other silicon containing compounds. Thus, useful sources of silicon in the active materials of the invention include orthosilicates, pyrosilicates, cyclic silicate anions such as $(Si_3O_9)^{6-}$, $(Si_6O_{18})^{12-}$ and the like, and pyrocenes represented by the formula $[(SiO_3)^{2-}]_n$, for example $LiAl(SiO_3)_2$. Silica or $SiO_2$ may also be used. Partial substitution of silicate for phosphate is illustrated in Example 4.

Representative arsenate compounds that may be used to prepare the active materials of the invention include $H_3AsO_4$ and salts of the anions $[H_2AsO_4]^-$ and $[HAsO_4]^{2-}$. Sources of antimonate in the active materials can be provided by antimony-containing materials such as $Sb_2O_5$, $M^ISbO_3$ where $M^I$ is a metal having oxidation state +1, $M_i^{III}SbO_4$ where $M^{III}$ is a metal having an oxidation state of +3, and $M^{II}Sb_2O_7$ where $M^{II}$ is a metal having an oxidation state of +2. Additional sources of antimonate include compounds such as $Li_3SbO_4$, $NH_4H_2SbO_4$, and other alkali metal and/or ammonium mixed salts of the $[SbO_4]^{3-}$ anion.

Sources of sulfate compounds that can be used to partially replace phosphorous in the active materials with sulfur include alkali metal and transition metal sulfates and bisulfates as well as mixed metal sulfates such as $(NH_4)_2Fe(SO_4)_2$, $NH_4Fe(SO_4)_2$ and the like. Finally, when it is desired to replace part or all of the phosphorous in the active materials with germanium, a germanium containing compound such as $GeO_2$ may be used.

To prepare the active materials containing the modified phosphate groups, it generally suffices to choose the stoichiometry of the starting materials based on the desired stoichiometry of the modified phosphate groups in the final product and react the starting materials together according to the procedures described above with respect to the phosphate materials. Naturally, partial or complete substitution of the phosphate group with any of the above modified or replacement phosphate groups will entail a recalculation of the stoichiometry of the required starting materials.

A starting material may provide more than one of the components A, M, $XY_4$, and Z, as is evident in the list above. In various embodiments of the invention, starting materials are provided that combine, for example, the metal and the phosphate, thus requiring only the alkali metal to be added. In one embodiment, a starting material is provided that contains alkali metal, metal, and phosphate. As a general rule, there is flexibility to select starting materials containing any of the components of alkali metal A, metal M, and phosphate (or other $XY_4$ moiety), as well as halide or hydroxide Z, depending on availability. Combinations of starting materials providing each of the components may also be used.

In general, any anion may be combined with the alkali metal cation to provide the optional alkali metal source starting material, or with a metal M cation to provide a metal starting material. Likewise, any cation may be combined with the halide or hydroxide anion to provide the source of Z component starting material, and any cation may be used as counterion to the phosphate or similar $XY_4$ component. It is preferred, however, to select starting materials with counterions that give rise to the formation of volatile by-products during the solid state reaction. Thus, it is desirable to choose ammonium salts, carbonates, bicarbonates, oxides, hydroxides, and the like where possible. Starting materials with these counterions tend to form volatile by-products such as water, ammonia, and carbon dioxide, which can be readily removed from the reaction mixture. Similarly, sulfur-containing anions such as sulfate, bisulfate, sulfite, bisulfite and the like tend to result in volatile sulfur oxide by-products. Nitrogen-containing anions such as nitrate and nitrite also tend to give volatile $NO_x$ by-products.

As noted above, the reactions may be carried out without reduction, or in the presence of a reductant. In one aspect, the reductant, which provides reducing power for the reactions, may be provided in the form of a reducing carbon by including a source of elemental carbon along with the other particulate starting materials. In this case, the reducing power is provided by simultaneous oxidation of carbon to either carbon monoxide or carbon dioxide.

The starting materials containing transition metal compounds are mixed together with carbon, which is included in an amount sufficient to reduce the metal ion of one or more of the metal-containing starting materials without full reduction to an elemental metal state. (Excess quantities of the reducing carbon may be used to enhance product quality.) An excess of carbon, remaining after the reaction, functions as a conductive constituent in the ultimate electrode formulation. This is an advantage since such remaining carbon is very intimately mixed with the product active material. Accordingly, large quantities of excess carbon, on the order of 100% excess carbon or greater are useable in the process. In a preferred embodiment, the carbon present during compound formation is intimately dispersed throughout the precursor and product. This provides many advantages, including the enhanced conductivity of the product. In a preferred embodiment, the presence of carbon particles in the starting materials also provides nucleation sites for the production of the product crystals.

Alternatively or in addition, the source of reducing carbon may be provided by an organic material. The organic material is characterized as containing carbon and at least one other element, preferably hydrogen. The organic material generally forms a decomposition product, referred to herein as a carbonaceous material, upon heating under the conditions of the reaction. Without being bound by theory, representative decomposition processes that can lead to the formation of the carbonaceous material include pyrolization, carbonization, coking, destructive distillation, and the like. These process names, as well as the term thermal decomposition, are used interchangeably in this application to refer to the process by which a decomposition product capable of acting as a reductant is formed upon heating of a reaction mixture containing an organic material.

A typical decomposition product contains carbonaceous material. During reaction in a preferred embodiment, at least a portion of the carbonaceous material formed participates as a reductant. That portion that participates as reductant may form a volatile by-product such as discussed below. Any volatile by-product formed tends to escape from the reaction mixture so that it is not incorporated into the reaction product.

Although the invention is understood not to be limited as to the mechanism of action of the organic precursor material, it believed that the carbonaceous material formed from decomposition of the organic material provides reducing power similar to that provided by elemental carbon discussed above. For example, the carbonaceous material may produce carbon monoxide or carbon dioxide, depending on the temperature of the reaction.

In a preferred embodiment, some of the organic material providing reducing power is oxidized to a non-volatile component, such as for example, oxygen-containing carbon materials such as alcohols, ketones, aldehydes, esters, and carboxylic acids and anhydrides. Such non-volatile by-products, as well as any carbonaceous material that does not participate as reductant (for example, any present in stoichiometric excess or any that does not otherwise react) will tend to remain in the reaction mixture along with the other reaction products, but will not be significantly covalently incorporated.

The carbonaceous material prepared by heating the organic precursor material will preferably be enriched in carbon relative to the mole per cent carbon present in the organic material. The carbonaceous material preferably contains from about 50 up to about 100 mole percent carbon.

While in some embodiments the organic precursor material forms a carbonaceous decomposition product that acts as a reductant as discussed above with respect to elemental carbon, in other embodiments a portion of the organic material may participate as reductant without first undergoing decomposition. The invention is not limited by the exact mechanism or mechanisms of the underlying reduction processes.

As with elemental carbon, reactions with the organic precursor material are conveniently carried out by combining starting materials and heating. The starting materials include at least one transition metal compound as noted above. For convenience, it is preferred to carry out the decomposition of the organic material and the reduction of a transition metal in one step. In this embodiment, the organic material decomposes in the presence of the transition metal compound to form a decomposition product capable of acting as a reductant, which reacts with the transition metal compound to form a reduced transition metal compound. In another embodiment, the organic material may be decomposed in a separate step to form a decomposition product. The decomposition product may then be combined with a transition metal compound to form a mixture. The mixture may then be heated for a time and at a temperature sufficient to form a reaction product comprising a reduced transition metal compound.

The organic precursor material may be any organic material capable of undergoing pyrolysis or carbonization, or any other decomposition process that leads to a carbonaceous material rich in carbon. Such precursors include in general any organic material, i.e., compounds characterized by containing carbon and at least one other element. Although the organic material may be a perhalo compound containing essentially no carbon-hydrogen bonds, typically the organic materials contain carbon and hydrogen. Other elements, such as halogens, oxygen, nitrogen, phosphorus, and sulfur, may be present in the organic material, as long as they do not significantly interfere with the decomposition process or otherwise prevent the reductions from being carried out. Precursors include organic hydrocarbons, alcohols, esters, ketones, aldehydes, carboxylic acids, sulfonates, and ethers. Preferred precursors include the above species containing aromatic rings, especially the aromatic hydrocarbons such as tars, pitches, and other petroleum products or fractions. As used here, hydrocarbon refers to an organic compound made up of carbon and hydrogen, and containing no significant amounts of other elements. Hydrocarbons may contain impurities having some heteroatoms. Such impurities might result, for example, from partial oxidation of a hydrocarbon or incomplete separation of a hydrocarbon from a reaction mixture or natural source such as petroleum.

Other organic precursor materials include sugars and other carbohydrates, including derivatives and polymers. Examples of polymers include starch, cellulose, and their ether or ester derivatives. Other derivatives include the partially reduced and partially oxidized carbohydrates discussed below. On heating, carbohydrates readily decompose to form carbon and water. The term carbohydrates as used here encompasses the D-, L-, and DL- forms, as well as mixtures, and includes material from natural or synthetic sources.

In one sense as used in the invention, carbohydrates are organic materials that can be written with molecular formula $(C)_m(H_2O)_n$, where m and n are integers. For simple hexose or pentose sugars, m and n are equal to each other. Examples of hexoses of formula $C_6H_{12}O_6$ include allose, altose, glucose, mannose, gulose, inose, galactose, talose, sorbose, tagatose, and fructose. Pentoses of formula $C_5H_{10}O_5$ include ribose, arabinose, and xylose. Tetroses include erythrose and threose, while glyceric aldehyde is a triose. Other carbohydrates include the two-ring sugars (di-saccharides) of general formula $C_{12}H_{22}O_{11}$. Examples include sucrose, maltose, lactose, trehalose, gentiobiose, cellobiose, and melibiose. Three-ring (trisaccharides such as raffinose) and higher oligomeric and polymer carbohydrates may also be used. Examples include starch and cellulose. As noted above, the carbohydrates readily decompose to carbon and water when heated to a sufficiently high temperature. The water of decomposition tends to turn to steam under the reaction conditions and volatilize.

It will be appreciated that other materials will also tend to readily decompose to $H_2O$ and a material very rich in carbon. Such materials are also intended to be included in the term "carbohydrate" as used in the invention. Such materials include slightly reduced carbohydrates such as glycerol, sorbitol, mannitol, iditol, dulcitol, talitol, arabitol, xylitol, and adonitol, as well as "slightly oxidized" carbohydrates such as gluconic, mannonic, glucuronic, galacturonic, marmuronic, saccharic, manosaccharic, ido-saccharic, mucic, talo-mucic, and allo-mucic acids. The formula of the slightly oxidized and the slightly reduced carbohydrates is similar to that of the carbohydrates.

A preferred carbohydrate is sucrose. Under the reaction conditions, sucrose melts at about 150-180° C. Preferably, the liquid melt tends to distribute itself among the starting materials. At temperatures above about 450° C., sucrose and other carbohydrates decompose to form carbon and water. The as-decomposed carbon powder is in the form of fresh amorphous fine particles with high surface area and high reactivity.

The organic precursor material may also be an organic polymer. Organic polymers include polyolefins such as polyethylene and polypropylene, butadiene polymers, isoprene polymers, vinyl alcohol polymers, furfuryl alcohol polymers, styrene polymers including polystyrene, polystyrene-polybutadiene and the like, divinylbenzene polymers, naphthalene polymers, phenol condensation products including those obtained by reaction with aldehyde, polyacrylonitrile, polyvinyl acetate, as well as cellulose starch and esters and ethers thereof described above.

In some embodiments, the organic precursor material is a solid available in particulate form. Particulate materials may be combined with the other particulate starting materials and reacted by heating according to the methods described above.

In other embodiments, the organic precursor material may be a liquid. In such cases, the liquid precursor material is combined with the other particulate starting materials to form a mixture. The mixture is heated, whereupon the organic material forms a carbonaceous material in situ. The reaction proceeds with carbothermal reduction. The liquid precursor materials may also advantageously serve or function as a binder in the starting material mixture as noted above.

Reducing carbon is preferably used in the reactions in stoichiometric excess. To calculate relative molar amounts of reducing carbon, it is convenient to use an "equivalent" weight of the reducing carbon, defined as the weight per gram-mole of carbon atom. For elemental carbons such as carbon black, graphite, and the like, the equivalent weight is about 12 g/equivalent. For other organic materials, the equivalent weight per gram-mole of carbon atoms is higher. For example, hydrocarbons have an equivalent weight of about 14 g/equivalent. Examples of hydrocarbons include aliphatic, alicyclic, and aromatic hydrocarbons, as well as polymers containing predominantly or entirely carbon and hydrogen in the polymer chain. Such polymers include polyolefins and aromatic polymers and copolymers, including polyethylenes, polypropylenes, polystyrenes, polybutadienes, and the like. Depending on the degree of unsaturation, the equivalent weight may be slightly above or below 14.

For organic materials having elements other than carbon and hydrogen, the equivalent weight for the purpose of calculating a stoichiometric quantity to be used in the reactions is generally higher than 14. For example, in carbohydrates it is about 30 g/equivalent. Examples of carbohydrates include sugars such as glucose, fructose, and sucrose, as well as polymers such as cellulose and starch.

Although the reactions may be carried out in oxygen or air, the heating is preferably conducted under an essentially non-oxidizing atmosphere. The atmosphere is essentially non-oxidizing so as not to interfere with the reduction reactions taking place. An essentially non-oxidizing atmosphere can be achieved through the use of vacuum, or through the use of inert gases such as argon, nitrogen, and the like. Although oxidizing gas (such as oxygen or air), may be present, it should not be at so great a concentration that it interferes with the carbothermal reduction or lowers the quality of the reaction product. It is believed that any oxidizing gas present will tend to react with the reducing carbon and lower the availability of the carbon for participation in the reaction. To some extent, such a contingency can be anticipated and accommodated by providing an appropriate excess of reducing carbon as a starting material. Nevertheless, it is generally preferred to carry out the carbothermal reduction in an atmosphere containing as little oxidizing gas as practical.

In a preferred embodiment, reduction is carried out in a reducing atmosphere in the presence of a reductant as discussed above. The term "reducing atmosphere" as used herein means a gas or mixture of gases that is capable of providing reducing power for a reaction that is carried out in the atmosphere. Reducing atmospheres preferably contain one or more so-called reducing gases. Examples of reducing gases include hydrogen, carbon monoxide, methane, and ammonia, as well as mixtures thereof. Reducing atmospheres also preferably have little or no oxidizing gases such as air or oxygen. If any oxidizing gas is present in the reducing atmosphere, it is preferably present at a level low enough that it does not significantly interfere with any reduction processes taking place.

The stoichiometry of the reduction can be selected along with the relative stoichiometric amounts of the starting components A, M, $PO_4$ (or other $XY_4$ moiety), and Z. It is usually easier to provide the reducing agent in stoichiometric excess and remove the excess, if desired, after the reaction. In the case of the reducing gases and the use of reducing carbon such as elemental carbon or an organic material, any excess reducing agent does not present a problem. In the former case, the gas is volatile and is easily separated from the reaction mixture, while in the latter, the excess carbon in the reaction product does not harm the properties of the active material, particularly in embodiments where carbon is added to the active material to form an electrode material for use in the electrochemical cells and batteries of the invention. Conveniently, the by-products carbon monoxide or carbon dioxide (in the case of carbon) or water (in the case of hydrogen) are readily removed from the reaction mixture.

When using a reducing atmosphere, it is difficult to provide less than an excess of reducing gas such as hydrogen. Under such as a situation, it is preferred to control the stoichiometry of the reaction by the other limiting reagents. Alternatively, the reduction may be carried out in the presence of reducing carbon such as elemental carbon. Experimentally, it would be possible to use precise amounts of reductant carbon to make products of a chosen stoichiometry. However, it is preferred to carry out the carbothermal reduction in a molar excess of carbon. As with the reducing atmosphere, this is easier to do experimentally, and it leads to a product with excess carbon dispersed into the reaction product, which as noted above provides a useful active electrode material.

Before reacting the mixture of starting materials, the particles of the starting materials are intermingled. Preferably, the starting materials are in particulate form, and the intermingling results in an essentially homogeneous powder mixture of the precursors. In one embodiment, the precursor powders are dry-mixed using, for example, a ball mill. Then the mixed powders are pressed into pellets. In another embodiment, the precursor powders are mixed with a binder. The binder is preferably selected so as not to inhibit reaction between particles of the powders. Preferred binders decompose or evaporate at a temperature less than the reaction temperature. Examples include mineral oils, glycerol, and polymers that decompose or carbonize to form a carbon residue before the reaction starts, or that evaporate before the reaction starts. In one embodiment, the binders used to hold the solid particles also function as sources of reducing carbon, as described above. In still another embodiment, intermingling is accomplished by forming a wet mixture using a volatile solvent and then the intermingled particles are pressed together in pellet form to provide good grain-to-grain contact.

The mixture of starting materials is heated for a time and at a temperature sufficient to form an inorganic transition metal compound reaction product. If the starting materials include a reducing agent, the reaction product is a transition metal compound having at least one transition metal in a lower oxidation state relative to its oxidation state in the starting materials.

Preferably, the particulate starting materials are heated to a temperature below the melting point of the starting materials. Preferably, at least a portion of the starting material remains in the solid state during the reaction.

The temperature should preferably be about 400° C. or greater, and desirably about 450° C. or greater, and preferably about 500° C. or greater, and generally will proceed at a faster rate at higher temperatures. The various reactions involve production of CO or $CO_2$ as an effluent gas. The equilibrium at higher temperature favors CO formation. Some of the reactions are more desirably conducted at temperatures greater than about 600° C.; most desirably greater than about 650° C.; preferably about 700° C. or greater; more preferably about 750° C. or greater. Suitable ranges for many reactions are from about 700 to about 950° C., or from about 700 to about 800° C.

Generally, the higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $CO_2$ reaction involves an increase in carbon oxidation state of +4 (from 0 to 4) and the C to CO reaction involves an increase in carbon oxidation state of +2 (from ground state zero to 2). Here, higher temperature generally refers to a range of about 650° C. to about 1000° C. and lower temperature refers to up to about 650° C. Temperatures higher than about 1200° C. are not thought to be needed.

In one embodiment, the methods of this invention utilize the reducing capabilities of carbon in a unique and controlled manner to produce desired products having structure and alkali metal content suitable for use as electrode active materials. The advantages are at least in part achieved by the reductant, carbon, having an oxide whose free energy of formation becomes more negative as temperature increases. Such oxide of carbon is more stable at high temperature than at low temperature. This feature is used to produce products having one or more metal ions in a reduced oxidation state relative to the precursor metal ion oxidation state.

Referring back to the discussion of temperature, at about 700° C. both the carbon to carbon monoxide and the carbon to carbon dioxide reactions are occurring. At closer to about 600° C. the C to $CO_2$ reaction is the dominant reaction. At closer to about 800° C. the C to CO reaction is dominant. Since the reducing effect of the C to $CO_2$ reaction is greater, the result is that less carbon is needed per atomic unit of metal to be reduced. In the case of carbon to carbon monoxide, each atomic unit of carbon is oxidized from ground state zero to plus 2. Thus, for each atomic unit of metal ion (M) which is being reduced by one oxidation state, one half atomic unit of carbon is required. In the case of the carbon to carbon dioxide reaction, one quarter atomic unit of carbon is stoichiometrically required for each atomic unit of metal ion (M) which is reduced by one oxidation state, because carbon goes from ground state zero to a plus 4 oxidation state. These same relationships apply for each such metal ion being reduced and for each unit reduction in oxidation state desired.

The starting materials may be heated at ramp rates from a fraction of a degree up to about 10° C. per minute. Higher or lower ramp rates may be chosen depending on the available equipment, desired turnaround, and other factors. It is also possible to place the starting materials directly into a preheated oven. Once the desired reaction temperature is attained, the reactants (starting materials) are held at the reaction temperature for a time sufficient for reaction to occur. Typically the reaction is carried out for several hours at the final reaction temperature. The heating is preferably conducted under non-oxidizing or inert gas such as argon or vacuum, or in the presence of a reducing atmosphere.

After reaction, the products are preferably cooled from the elevated temperature to ambient (room) temperature (i.e., about 10° C. to about 40° C.). The rate of cooling may vary according to a number of factors including those discussed above for heating rates. For example, the cooling may be conducted at a rate similar to the earlier ramp rate. Such a cooling rate has been found to be adequate to achieve the desired structure of the final product. It is also possible to quench the products to achieve a higher cooling rate, for example on the order of about 100° C./minute.

The general aspects of the above synthesis routes are applicable to a variety of starting materials. The metal compounds may be reduced in the presence of a reducing agent, such as hydrogen or carbon. The same considerations apply to other metal and phosphate containing starting materials. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

A preferred process of the present invention is for producing an electrode active material having the general formula $$(LiM(PO_{4-x}Y'_x))$$

wherein M is $M^1{}_g M^2{}_h M^3{}_i M^4{}_j$, and
(i) $M^1$ is one or more transition metals;
(ii) $M^2$ is one or more +2 oxidation state non-transition metals;
(iii) $M^3$ is one or more +3 oxidation state non-transition metals,
(iv) $M^4$ is one or more +1 oxidation state non-transition metals;
(v) Y' is halogen; and
(vi) g>0, h>0, each of i, and j≧0; (g+h+i+j)≦1, and 0≦x≦0.5;

said method comprising:
a) forming a first mixture comprising (i) a lithium hydrogen phosphate having a first average particle size, and (ii) Group 2 metal hydroxide having a second average particle size, wherein said first average particle size is between about 70 times and 110 times greater than said second average particle size;
b) grinding said first mixture in a jet mill to form a milled lithium hydrogen phosphate;
c) reacting starting materials to form said active material, wherein said starting materials comprise said milled lithium hydrogen phosphate; said Group 2 metal hydroxide; at least one source of transition metal $M^1$; at least one source of metal $M^3$, if i>0; and at least one source of halide Y, if x>0.

The following non-limiting examples illustrate the methods of the present invention.

EXAMPLE 1

Particles of lithium hydrogen phosphate and magnesium hydroxide are first mixed together. Approximately 103.9 g (about 1.0 mol) of $LiH_2PO_4$ and about 5.8 g (about 0.1 mol) of $Mg(OH)_2$ are mixed in a V-Shell blender under vacuum. This mixture, by weight, is about 95% $LiH_2PO_4$ and about 5% $Mg(OH)_2$. An exemplary mixer used is the Patterson-Kelly Solids Processor and was heated with hot oil in an outer shell. The mixer rotates and includes an internal intensification bar. While mixing, the unit is heated to about 90° C. This mixing process is continued over about eight hours, which includes the heat-up and cool-down time.

The mixture of lithium hydrogen phosphate and magnesium hydroxide is then transferred to a Jet Pulverizer, Jet Micron jet mill. The material is placed into a hopper and fed into the jet mill with an Accurate screw type feeder at about 1 kg/min. The material is entrained, as it is fed into the Jet mill, in a stream of compressed dry air. The air is at a pressure of about 80 psi. The ground material is collected on a sleeve which is intermittently cleared with a pulse of air. The cleared material is collected for processing into an electroactive material. The final product is then tested in a Coulter LS100 laser diffraction to verify required particle size.

After jet milling the average particle size of the lithium hydrogen phosphate and the magnesium hydroxide is about 5 μm. With reference to FIG. 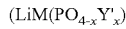 1 the average and range of the particle size of the unground lithium hydrogen phosphate particles is vastly disparate from the average and range of the particle of magnesium hydroxide particles, illustrated in FIG.

2. After jet milling, as a mixture, the particle distribution of the mixture of lithium hydrogen phosphate and magnesium hydroxide, is generally homogeneous, as illustrated in FIG. 3.

EXAMPLE 2

An electrode active material of the formula $LiFe_{0.9}Mg_{0.1}PO_4$ is made according to the following general reaction scheme.

$$1.0\ LiH_2PO_4 + 0.45\ Fe_2O_3 + 0.10\ Mg(OH)_2 + 0.45\ C \rightarrow LiFe_{0.9}Mg_{0.1}PO_4 + 0.45\ CO + 1.1\ H_2O$$

The following starting material are mixed in the following proportions

| Material | Moles | Amount (g) |
|---|---|---|
| $LiH_2PO_4$ | 1.0 | 103.9 |
| $Fe_2O_3$ | 0.45 | 71.9 |
| $Mg(OH)_2$ | 0.10 | 5.8 g |
| carbon | 0.90 (100% excess) | 10.8 |

The $LiH_2PO_4$ and $Mg(OH)_2$ are provided from the precursor mixture made according to Example 1. The starting materials are then mixed, and pelletized. The pellets are then heated to about 750° C. at a rate of 2°/minute in argon, and maintained at that temperature for about 8 hours. The pellets are then cooled a rate of about 2° C./minute, and the pellet is powderized to form the active material The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A method for producing electrode active material precursor comprising:
    a) producing a mixture comprising particles of lithium hydrogen phosphate, having a first average particle size, and a metal hydroxide, having a second average particle size;
    b) grinding said mixture in a jet mill for a period of time suitable to produce a generally homogeneous mixture of particles having a third average size smaller than said first average size; and
    c) wherein said first, average particle size of said lithium hydrogen phosphate is at least 20 times that of said second average particle size of said metal hydroxide.

2. A method for producing an electrode active material having the general formula $$(LiM(PO_{4-x}Y'_x)$$

wherein M is $M^1{}_g M^2{}_h M^3{}_i M^4{}_j$, and
    (i) $M^1$ is one or more transition metals;
    (ii) $M^2$ is one or more +2 oxidation state non-transition metals;
    (iii) $M^3$ is one or more +3 oxidation state non-transition metals,
    (iv) $M^4$ is one or more +1 oxidation state non-transition metals;
    (v) Y' is halogen; and
    (vi) $g>0$, $h>0$, each of i, and $j \geq 0$; $(g+h+i+j) \leq 1$, and $0 \leq x \leq 0.5$;

said method comprising:
    a) forming a first mixture comprising (i) a lithium hydrogen phosphate having a first average particle size, and (ii) Group 2 metal hydroxide having a second average particle size, wherein said first average particle size is between about 70 times and 110 times greater than said second average particle size;
    b) grinding said first mixture in a jet mill to form a milled lithium hydrogen phosphate;
    c) reacting starting materials to form said active material, wherein said starting materials comprise said milled lithium hydrogen phosphate; said Group 2 metal hydroxide; at least one source of transition metal $M^1$; at least one source of metal $M^3$, if $i > 0$; and at least one source of halide Y, if $x > 0$.

3. A method to claim 2, wherein $g \geq 0.8$.

4. A method according to claim 3, wherein $M^1$ is a +2 oxidation state transition metal selected from the group consisting of V, Cr, Mn, Fe, Co, Ni, and mixtures thereof.

5. A method according to claim 4, wherein $M^1$ is selected from the group consisting of Fe, Co, and mixtures thereof.

6. A method according to claim 2, wherein $0.01 \leq (h+i) \leq 0.5$.

7. A method according to claim 6, wherein $0.01 \leq h \leq 0.2$.

8. A method according to claim 7, wherein. $M^2$ is selected from the group consisting of Be, Mg, Ca, Sr, Ba, and mixtures thereof.

9. A method according to claim 8, wherein $M^2$ comprises Mg.

10. A method according to claim 6, wherein $0.01 \leq i \leq 0.2$.

11. A method according to claim 10, wherein $M^3$ is Al.

12. A method according to claim 2, wherein $j=0$.

13. A method according to claim 2, wherein $0.01 \leq j \leq 0.1$.

14. A method according to claim 2, wherein $x=0$.

15. A method according to claim 2, wherein $0 < x \leq 1$.

16. A method according to claim 2, wherein said active material is selected from the group consisting of $LiFePO_4$; $LiFe_{0.9}Mg_{0.1}PO_4$; $LiFe_{0.8}Mg_{0.2}PO_4$; $Li_{1.025}Co_{0.85}Fe_{0.05}Al_{0.025}Mg_{0.05}PO_4$, $Li_{1.025}Co_{0.80}Fe_{0.10}Al_{0.025}Mg_{0.05}PO_4$, $Li_{1.025}Co_{0.75}Fe_{0.15}Al_{0.025}Mg_{0.05}PO_4$, $Li_{1.025}Co_{0.7}(Fe_{0.4}Mn_{0.6})_{0.2}Al_{0.025}Mg_{0.05}PO_4$, $LiCo_{0.8}Fe_{0.1}Al_{0.025}Ca_{0.05}PO_{3.975}F_{0.025}$, $LiCo_{0.8}Fe_{0.1}Al_{0.025}Mg_{0.05}PO_{3.975}F_{0.025}$, $LiCo_{0.8}Fe_{0.1}Ti_{0.025}Mg_{0.05}PO_4$; $Li_{1.025}Co_{0.8}Fe_{0.1}Ti_{0.025}Al_{0.025}PO_4$; $Li_{1.025}Co_{0.8}Fe_{0.1}Ti_{0.025}Mg_{0.025}PO_{3.975}F_{0.025}$; $LiCo_{0.825}Fe_{0.1}Ti_{0.025}Mg_{0.025}PO_4$; and $LiCo_{0.85}Fe_{0.075}Ti_{0.025}Mg_{0.025}PO_4$.

17. A method according to claim 9, wherein said metal hydroxide is magnesium hydroxide.

18. A method according to claim 2, wherein said first mixture comprises at, least about 70% of said lithium hydrogen phosphate and up to about 30% of said metal hydroxide.

19. A method according to claim 18, wherein said first mixture comprises at least about 90% of said lithium hydrogen phosphate and up to about 10% of said metal hydroxide.

20. A method according to claim 2, wherein said starting materials additionally comprise carbon.

21. A method according to claim 20, wherein said active material is produced through carbothermal reduction.

* * * * *

UNITED STATES PATENT AND TRADEMARK OFFICE
CERTIFICATE OF CORRECTION

PATENT NO.      : 7,960,059 B2
APPLICATION NO. : 12/046942
DATED           : June 14, 2011
INVENTOR(S)     : Adamson et al.

It is certified that error appears in the above-identified patent and that said Letters Patent is hereby corrected as shown below:

Column 3 Line 15
Delete "$0 \leq x \leq 3$" Insert --$0 \leq x < 3$--

Column 8 Line 61
Delete "$0 \leq x \leq 1$" Insert --$0 < x \leq 1$--

Column 11 Line 54
Delete "$e+ f+ g \leq 2$" Insert --$e+ f+ g < 2$--

Column 12 Line 58
Delete "$0 \leq x \leq 1$" Insert --$0 < x \leq 1$--

Column 13 Line 35
Delete "$Fe_{0.5}$" Insert --$Fe_{0.15}$--

Column 14 Line 5
Delete "$Li_{0.075}$" Insert --$Li_{1.075}$--

Signed and Sealed this
Eleventh Day of September, 2012

David J. Kappos
*Director of the United States Patent and Trademark Office*